United States Patent
Griffing et al.

(10) Patent No.: US 11,061,162 B2
(45) Date of Patent: Jul. 13, 2021

(54) IN-SITU GAIN/PHASE CALIBRATION AND CHARACTERIZATION OF DOWNHOLE RECEIVER ELECTRONICS

(71) Applicant: HALLIBURTON ENERGY SERVICES, INC., Houston, TX (US)

(72) Inventors: Matthew Chase Griffing, Kingwood, TX (US); Imran Sharif Vehra, Kingwood, TX (US); Hsu-Hsiang Wu, Sugar Land, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 296 days.

(21) Appl. No.: 16/316,597

(22) PCT Filed: Oct. 28, 2016

(86) PCT No.: PCT/US2016/059434
§ 371 (c)(1),
(2) Date: Jan. 9, 2019

(87) PCT Pub. No.: WO2018/044337
PCT Pub. Date: Mar. 8, 2018

(65) Prior Publication Data
US 2019/0293830 A1    Sep. 26, 2019

Related U.S. Application Data

(60) Provisional application No. 62/383,256, filed on Sep. 2, 2016.

(51) Int. Cl.
*G01V 3/30* (2006.01)
*E21B 49/00* (2006.01)
(Continued)

(52) U.S. Cl.
CPC .............. *G01V 3/30* (2013.01); *E21B 47/125* (2020.05); *E21B 49/00* (2013.01); *G01V 13/00* (2013.01)

(58) Field of Classification Search
CPC ........ G01V 3/30; G01V 13/00; E21B 47/125; E21B 49/00; E21B 47/00
(Continued)

(56) References Cited

U.S. PATENT DOCUMENTS

| 7,839,148 B2 | 11/2010 | Vehra et al. | |
| 2004/0090234 A1* | 5/2004 | Macune | G01V 3/30 324/337 |

(Continued)

FOREIGN PATENT DOCUMENTS

| WO | 2012018452 A2 | 2/2012 |
| WO | 2014205006 A1 | 12/2014 |

OTHER PUBLICATIONS

International Search Report and Written Opinion; PCT Application No. PCT/US2016/059434; dated May 29, 2017.

*Primary Examiner* — Alvaro E Fortich
*Assistant Examiner* — Zannatul Ferdous
(74) *Attorney, Agent, or Firm* — Polsinelli PC

(57) ABSTRACT

A logging tool and a method for in-situ, independent calibration of receiver amplifier electronics separately from transmitter electronics. A logging tool can perform in-situ gain and phase calibration on one or more receiver assemblies, each consisting of at least a receiver amplifier electronics and a receiver antenna, and based on a calculated gain and phase of the receiver assembly, determine the true antenna amplitude and phase associated with a measurement made by the receiver assembly. The logging tool can perform in-situ crosstalk measurement and calibration, by determining a crosstalk matrix for all of the receiver assemblies and for each receiver assembly, removing the crosstalk (Continued)

interference from the measurement made by the receiver assembly.

22 Claims, 13 Drawing Sheets

(51) Int. Cl.
*G01V 13/00* (2006.01)
*E21B 47/125* (2012.01)

(58) Field of Classification Search
USPC ....... 324/333, 338–343, 346, 355, 356, 366, 324/368, 369; 702/2, 6, 7, 11, 12, 13
See application file for complete search history.

(56) References Cited

U.S. PATENT DOCUMENTS

| | | | |
|---|---|---|---|
| 2004/0113609 A1 | 6/2004 | Homan et al. | |
| 2005/0030037 A1 | 2/2005 | Fanini et al. | |
| 2005/0088180 A1 | 4/2005 | Flanagan | |
| 2007/0229082 A1* | 10/2007 | Vehra | G01V 3/30 |
| | | | 324/339 |
| 2012/0119744 A1* | 5/2012 | Habashy | G01V 3/20 |
| | | | 324/339 |
| 2015/0260874 A1* | 9/2015 | Chen | G01V 3/38 |
| | | | 324/338 |
| 2016/0245781 A1* | 8/2016 | Ahmad | G01F 1/66 |
| 2017/0074625 A1* | 3/2017 | Appleby | F42D 1/055 |

* cited by examiner

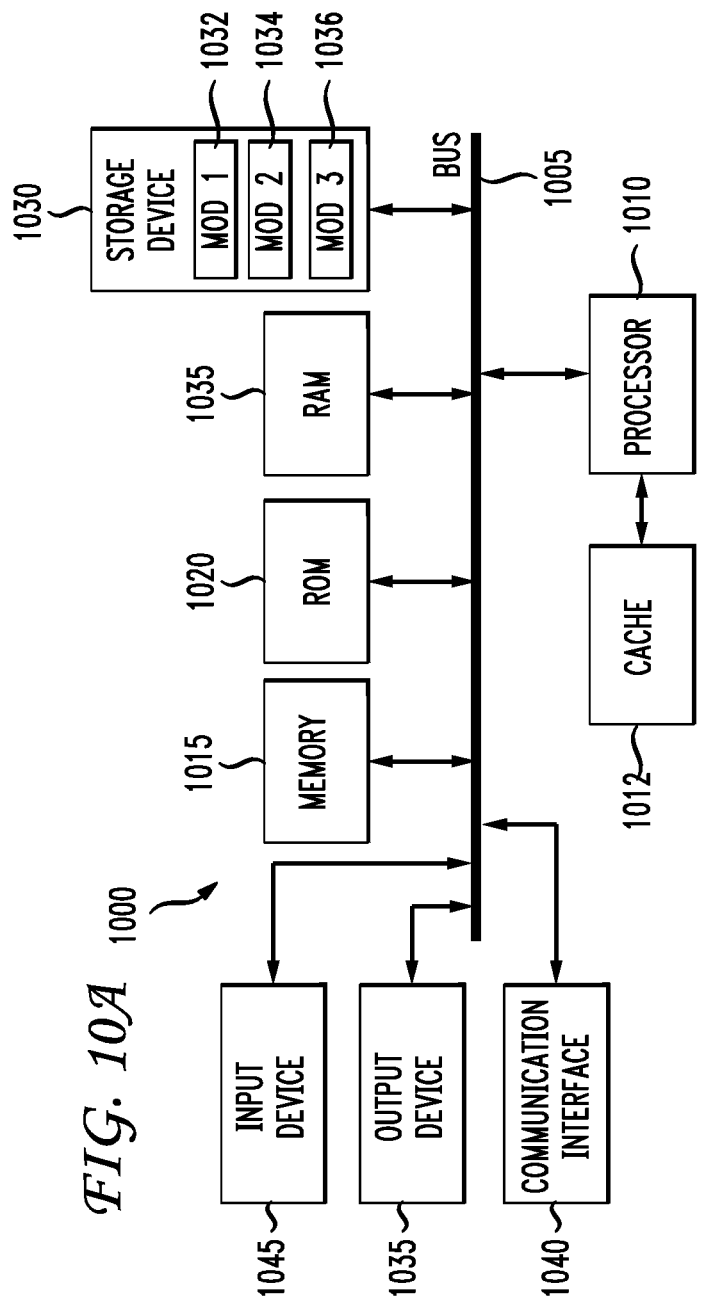

IN-SITU GAIN/PHASE CALIBRATION AND CHARACTERIZATION OF DOWNHOLE RECEIVER ELECTRONICS

CROSS-REFERENCE TO RELATED APPLICATIONS

This application is a national stage entry of PCT/US2016/059434 filed Oct. 28, 2016, which claims the benefit of U.S. Provisional application No. 62/383,256, filed on Sep. 2, 2016, each of the aforementioned applications are expressly incorporated herein in their entirety.

TECHNICAL FIELD

The present technology pertains to gain/phase calibration and characterization, and more specifically to in-situ gain/phase calibration and characterization of downhole receiver electronics of a downhole tool.

BACKGROUND

Receiver amplifier electronics are commonly used in downhole tools to amplify, filter, and measure the amplitude and phase of a signal present at an antenna, electrode, or other type of sensor. For most downhole tools, the entire tool resides within a single tool body or drill collar, so a complete tool calibration can be easily performed. For example, on a conventional logging while drilling (LWD) propagation resistivity tool, the transmitter and receiver antennas and electronics are contained on the same drill collar, with the antennas at a known and set orientation with respect to one another, so an airhang can be performed to determine the measurement (i.e., gain and phase) offset from the ideal response in air. Additionally, a similar calibration can be performed over temperature to characterize the thermal drift of the tool, typically referred to as a cooldown of the tool.

These calibrations and characterizations are performed at the tool level, which first requires the entire tool to be assembled. However, some very large tools, such as ultra-deep LWD resistivity tools, can be between 50 and 125 feet long and may consist of separate, multiple bodies or drill collars, making it impractical for the entire tool to be assembled at the surface. As such, it is likewise impractical for an airhang or other calibrations to be performed on the receiver electronics of such a tool.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 10A illustrates a schematic diagram of an example computing bus architecture.

DETAILED DESCRIPTION

Figure 1A:
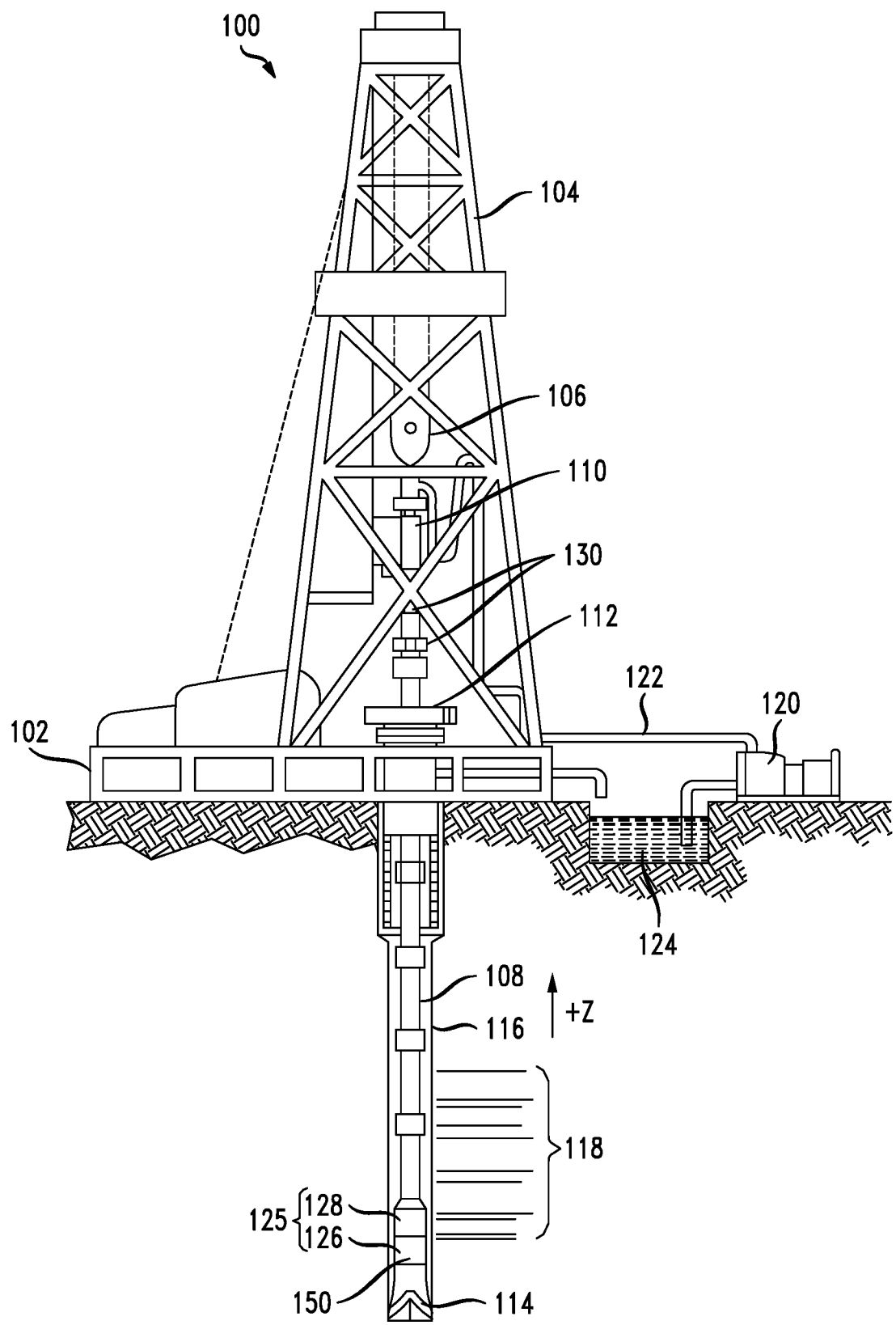
FIG. 1A illustrates a diagrammatic view of a logging while drilling (LWD) wellbore operating environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The disclosed technology addresses in-situ, independent calibration of receiver amplifier electronics, separate from transmitter electronics, in order to remove the burden of an extensive surface calibration. The approaches herein can make use of a Network Analyzer style measurement to determine an overall gain and phase response of the receiver amplifier electronics in a downhole tool. For example, a pre-determined or otherwise measured signal can be injected into the receiver electronics and the corresponding output signal can then be measured in order to calculate an overall gain and phase of the downhole receiver electronics. The input signal may also be measured separately and independently from the corresponding output signal.

Conventional LWD propagation resistivity tools, such as that disclosed in U.S. Pat. No. 7,839,148 B2 to Vehra et al., entitled "Method and System for Calibrating Downhole Tools for Drift" can determine the gain and phase ratio between two or more receiver channels in-situ. However, the generated input signal is never actually measured, as the geometry of conventional LWD propagation resistivity tools (wherein the transmitter and receiver antennas are fixedly provided in a single drill collar) permits the direct measurement of the gain and phase ratio. As such, there is never a need to measure or otherwise determine the gain and phase response of each individual receiver channel. The approaches herein can eliminate the need for a thermal calibration (cooldown) or a compensated antenna array that would otherwise be needed to calibrate a conventional LWD propagation resistivity tool.

Furthermore, overall gain and phase response of the receiver electronics can be calculated by determining the transmitter current to receiver voltage ratio. However, it may be difficult or impossible for this ratio to be measured directly for at least the reason that the receiver and transmitter electronics are located in different drill collars. Such a direct measurement is further complicated by the wide range of receiver gains that may be used, for example, in an ultra-deep measurement. Accordingly, the transmitter current and receiver voltage measurements are made separately and independently, and the ratio can then be calculated afterwards. These multiple measurements and the subsequent calculations can introduce error or inaccuracy to the final result in various ways. As such, an accurate gain and phase response for each receiver should be obtained so that the true receiver antenna amplitude and phase response can be determined.

Figure 1B:
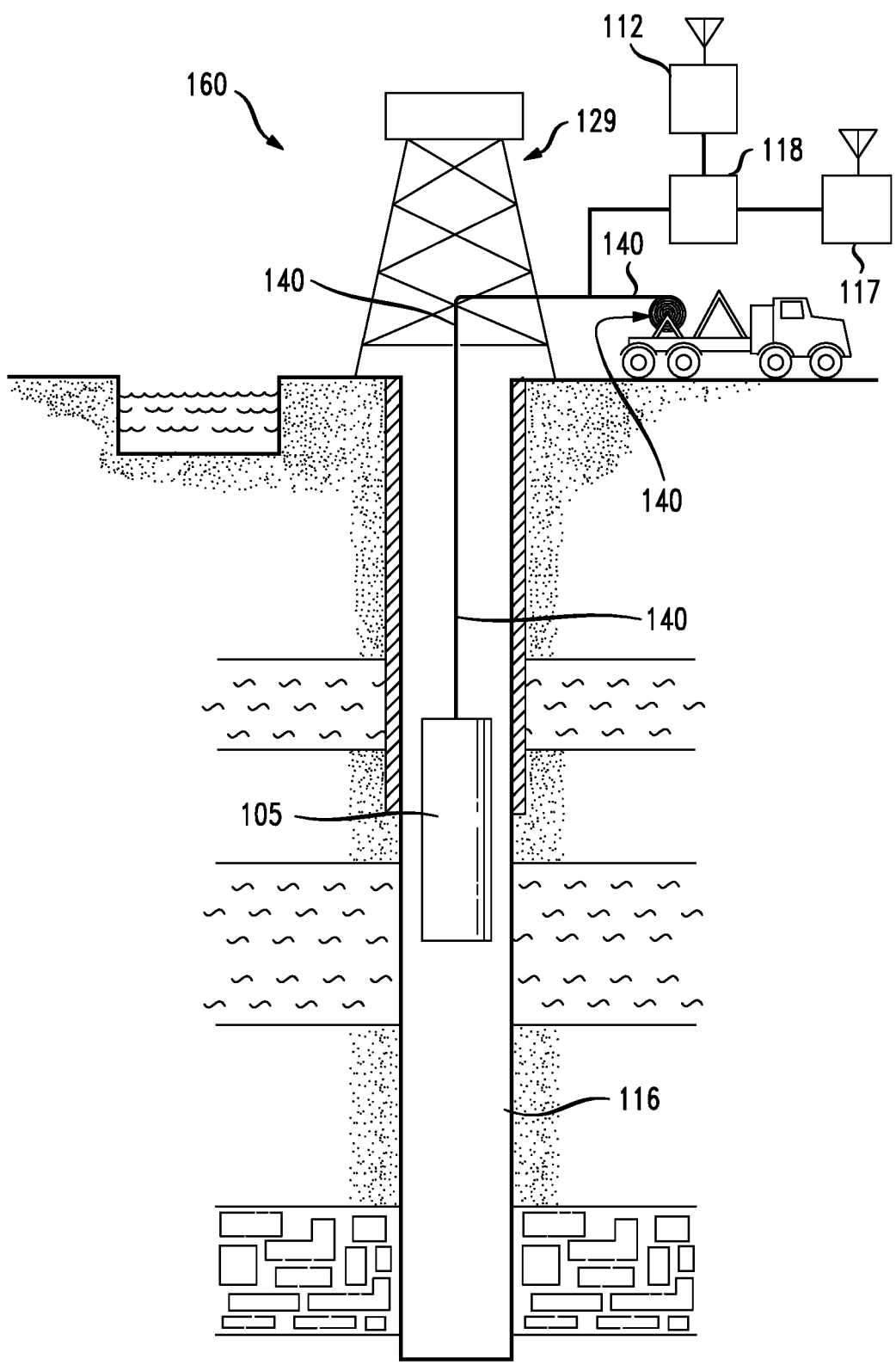
FIG. 1B illustrates a schematic diagram of an example system wellbore operating environment with a wireline conveyance.

Disclosed are a logging tool and methods for in-situ phase calibration and characterization of downhole receiver electronics. A brief introductory description of exemplary systems and environments, as illustrated in FIGS. 1A and 1B, is first disclosed herein. A detailed description of various methods, systems, and concepts for in-situ phase calibration and characterization of downhole receiver electronics, as shown in FIGS. 2-11, then follows. The disclosure concludes with a description of example computing devices which can be implemented for various operations and functions disclosed herein. These variations shall be described herein as the various embodiments are set forth. The disclosure now turns to FIG. 1A.

FIG. 1A illustrates a diagrammatic view of a logging while drilling (LWD) wellbore operating environment 100 in which the presently disclosed logging tool and method may be deployed in accordance with certain exemplary embodiments of the present disclosure. As depicted in FIG. 1A, a drilling platform 102 is equipped with a derrick 104 that supports a hoist 106 for raising and lowering a drill string 108. The hoist 106 suspends a top drive 110 suitable for rotating the drill string 108 and lowering the drill string 108 through the well head 112. Connected to the lower end of the drill string 108 is a drill bit 114. As the drill bit 114 rotates, the drill bit 114 creates a wellbore 116 that passes through various formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the wellbore 116 into the pit 124 and aids in maintaining the integrity of the wellbore 116. Various materials can be used for drilling fluid, including oil-based fluids and water-based fluids.

One or more logging tools 126 can be integrated into the bottom-hole assembly (BHA) 125 near the drill bit 114. As the drill bit 114 extends the wellbore 116 through the formations 118, logging tools 126 collect measurements relating to various formation properties as well as the orientation of the tool and various other drilling conditions as would be appreciated by one of ordinary skill in the art. The bottom-hole assembly 125 may also include a telemetry sub 128 to transfer measurement data to a surface receiver 130 and to receive commands from the surface. In at least some embodiments, the telemetry sub 128 communicates with a surface receiver 130 using mud pulse telemetry. In some embodiments, the telemetry sub 128 does not communicate with the surface, but rather stores logging data for later retrieval at the surface when the logging assembly is recovered.

Each of the logging tools 126 may include a plurality of tool components, spaced apart from each other, and communicatively coupled with one or more wires. The logging tools 126 may also include one or more computing devices 150 communicatively coupled with one or more of the plurality of tool components by one or more wires. The computing device 150 may be configured to control or monitor the performance of the tool, process logging data, and/or carry out the methods of the present disclosure.

One or more of the logging tools 126 may communicate with the surface receiver 130 via a wire, such as wired drillpipe, and in some embodiments, one or more of the logging tools 126 may receive electrical power from a wire that extends to the surface, include wires extending through a wired drillpipe. Additionally, one or more of the logging tools 126 may communicate with the surface receiver 130 via wireless signal transmission.

Additionally, logging tools 126 may include a resistivity logging tool (such as ultra-deep resistivity tool 170 discussed in FIG. 1C and further below). Resistivity logging tools may be used to provide an indication of the electrical resistivity of rock formations, such as formations 118, surrounding a wellbore. This electrical resistivity data is useful in ascertaining the presence (or absence thereof) of hydrocarbons in the subterranean formations. A typical resistivity tool can include a transmitter antenna and at least two receiver antennas located along a longitudinal axis of the tool and at different distances from the transmitter antenna. The transmitter antenna is used to transmit electromagnetic waves into the surrounding formation, which in turn induces an electrical voltage in each receiver antenna. Due to geometric spreading and absorption by the surrounding earth formation, the induced voltages in the two receiving antennas have different phases and amplitudes. The phase difference and amplitude ratio (attenuation) of the induced voltages in the receiver antenna are indicative of the resistivity of the formation. This describes a conventional LWD propagation resistivity tool for shallow measurements, and while the present disclosure could be used in such a case, it is also suitable for use in an ultra-deep resistivity tool as described herein, wherein multiple independent receiver and transmitter electronics are provided. The logging tool and method of the present disclosure permits multiple formation boundaries to be determined or identified at distances as far as 100 feet from the borehole, or even ahead of the drill bit 114, without requiring extensive surface calibration or assembly.

Referring to FIG. 1B, which depicts an illustrative drilling environment 160, a tool having tool body 105 can be employed with what are commonly referred to as wireline systems in order to carry out logging or other operations. For example, instead of using the drill string 108 of FIG. 1A to lower tool body 105, which may contain sensors or other instrumentation for detecting and logging nearby characteristics and conditions of the wellbore and surrounding formations, tool body 105 can be lowered into the wellbore 116 by a wireline conveyance 140, as shown in FIG. 1B. The tool having body 105 may include logging tools such as a resistivity tool, for example ultra-deep resistivity tool 170 discussed below. The wireline conveyance 140 can be anchored in a drill rig 129 or various other portable means such as a truck or the derrick 104. The wireline conveyance 140 can be formed from one or more wires, slicklines, cables, or the like, as well as tubular conveyances such as coiled tubing, joint tubing, or the like.

The illustrated wireline conveyance 140 can provide support for the tool, can enable communication to one or more of local processor 113 and remote processors 115 and 117, and can provide a downhole power supply to the tool. More particularly, the wireline conveyance 140 can include fiber optic cabling for carrying out communications, and is sufficiently strong and flexible to support the tool body 105 along the entire length of the wellbore 116. For slickline or coiled tubing configurations, power can be supplied downhole via one or more of a battery and a downhole generator.

Figure 1C:
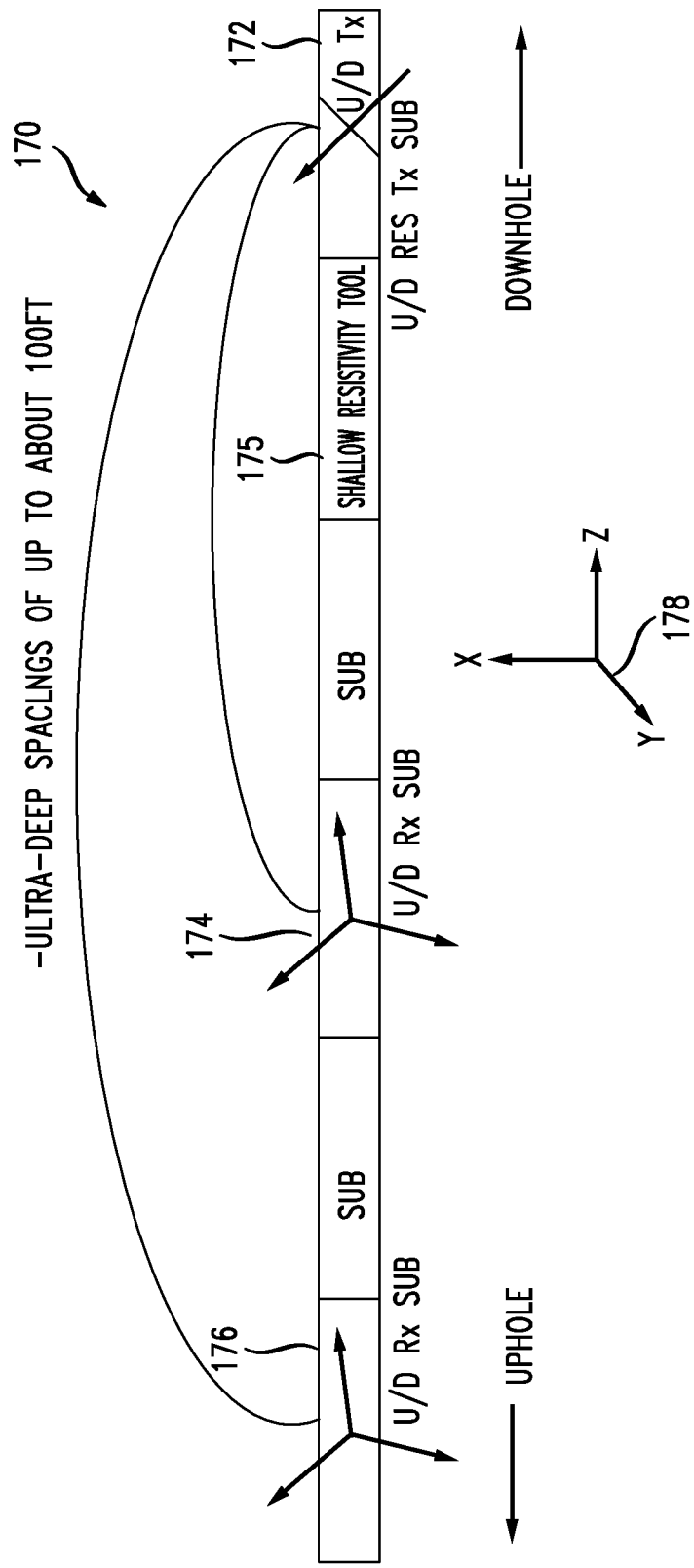
FIG. 1C illustrates an example ultra-deep resistivity tool.

FIG. 1C illustrates an example ultra-deep resistivity tool 170, which may be utilized in either of the drilling or wireline environments illustrated in FIG. 1A and FIG. 1B, and may be implemented in a sub or other component of a drilling string or wireline tool. As discussed previously, the ultra-deep resistivity tool 170 can make use of multiple independent transmitter and receiver antennas distributed in a wireline tool or drilling string (such as a bottom hole assembly (BHA)), and employs low frequencies in the range of 100 Hz to 100 kHz in order to determine or identify multiple formation boundaries at distances as far as 100 feet from the borehole, or even ahead of the drill bit or end of a wireline tool string.

As illustrated, a transmitter antenna 172 is provided near a downhole end of ultra-deep resistivity tool 170, wherein the downhole end is generally understood to signify a portion of a tool closer to the drill bit or the terminal face of the wellbore. A first receiver assembly 174 and a second receiver assembly 176 are provided away from the downhole end, such that they are positioned above transmitter antenna 172. Transmitter antenna 172 is oriented such that it creates field components in the X, Y, and Z directions, generally indicated by axes 178. Each receiver assembly 174, 176 includes arrays of receiver antennas (not illustrated) with differing orientations in order to provide tri-axial sensitivity and obtain all transmitter-receiver coupling components. While the illustrated embodiment depicts a single transmitter antenna and two receiver assemblies, it is understood that various configurations may be provided with one or more transmitter antennas and one or more receiver assemblies, without departing from the scope of the present disclosure. It would also be possible for the transmitter to be placed on the uphole side relative to the receivers, with the receivers placed downhole from it (i.e., flip the tool).

Generally, a conventional shallow propagation resistivity tool 175 is provided to assist with data measurement from the receiver assemblies 174, 176 and to perform a subsequent inversion of this data in order to obtain a representation of the formation. Additional assemblies, such as logging tools (e.g. LWD tools), or subs having such tools, may also be provided in order to help create the large spacings between the transmitter antenna 172 and the first and second receiver assemblies 174, 176 and to make efficient use of a wireline or drilling tool string (such as in a BHA).

Figure 2:
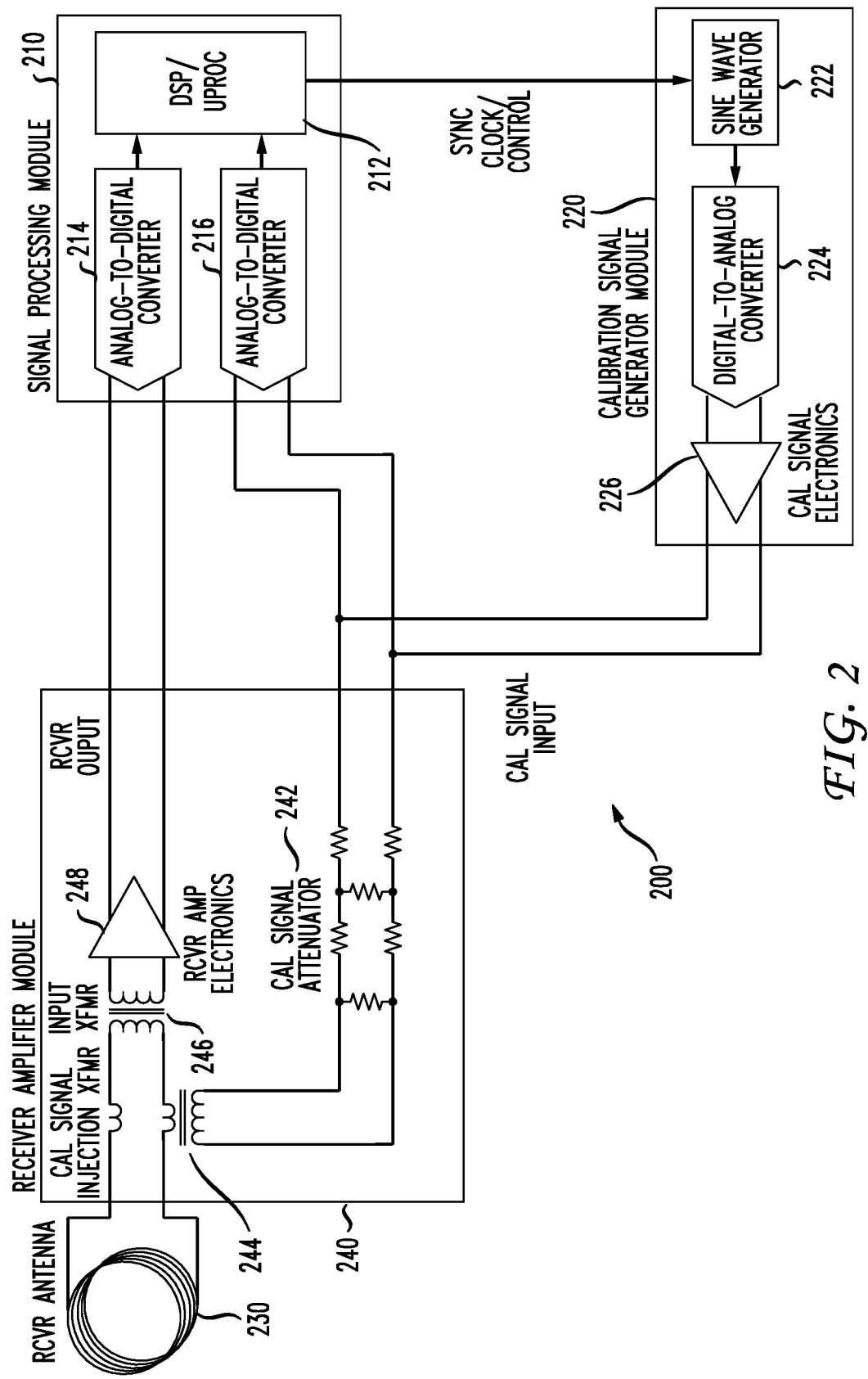
FIG. 2 illustrates a schematic diagram of an example in-situ receiver gain and phase calibration system.

FIG. 2 depicts a schematic diagram of an example in-situ receiver gain and phase calibration system 200 that can be used in a downhole logging tool. As illustrated, calibration system 200 consists of a signal processing module 210, a calibration signal generator module 220, a receiver antenna 230, and a receiver amplifier module 240, although it is understood that the aforementioned components can be combined or otherwise organized in a variety of manners without departing from the scope of the present disclosure. The combination of receiver antenna 230 and receiver amplifier module 240 will be generally referred to as a "receiver assembly".

Signal processing module 210 can be used to receive and analyze data in order to perform in-situ calibration, and consists of a processing element 212, which can be provided, for example, by one or more Digital Signal Processors (DSPs) or microprocessors, and further consists of a first analog-to-digital converter (ADC) 214 and a second ADC 216. Each of the ADCs 214, 216 is coupled to various components of receiver amplifier module 240 and/or calibration signal generator module 220 and thereby receives one or more analog signals outputted from the receiver amplifier module 240 and/or calibration signal generator module 220. Each ADC then performs analog-to-digital conversion on the received analog signal, and is coupled to processing element 212 in order to thereby output one or more converted digital signals to processing element 212. The processing element 212, in addition to being coupled to ADCs 214, 216, is further coupled to a sine wave generator 222 of the calibration signal generator module 220, thereby providing control and synchronization functionalities to the calibration signal generator module 220.

Calibration signal generator module 220 can be used to generate a reference calibration signal that is used to perform in-situ calibration, and consists of sine wave generator 222, a digital-to-analog converter (DAC) 224, and a calibration signal electronics 226. As illustrated, sine wave generator 222 receives synchronization or clock information as well as control signals from processing element 212, and in response, is operative to generate a digital sinusoidal waveform based on the received signals. This digital sinusoidal waveform provides the basis upon which the reference calibration signal of the present disclosure is to be formed. The digital sinusoidal waveform is then passed to DAC 224, which is coupled between sine wave generator 222 and calibration signal electronics 226. DAC 224 then performs digital-to-analog conversion on the received digital sinusoidal waveform, and outputs a converted analog sinusoidal waveform to calibration signal electronics 226.

Calibration signal electronics 226 receives the converted analog sinusoidal waveform as input, and generates an analog reference calibration signal in accordance with the synchronization information and control signals received from processing element 212. In some embodiments, the reference calibration signal is generated by receiving the converted analog sinusoidal waveform as input, and then sequentially filtering, amplifying or attenuating, and buffering out the signal, although one of ordinary skill in the art will understand that a variety of other operations may be undertaken in order to generate a reference calibration signal with the desired characteristics.

The output of calibration signal electronics 226 is coupled to at least one of the ADCs 214, 216 of signal processing module 210. As illustrated, the output of calibration signal electronics 226 is coupled to the second ADC 216, which receives the analog reference calibration signal, performs analog-to-digital conversion, and outputs a converted digital reference calibration signal to processing element 212, where it is retained for future use in the in-situ calibration process. This analog reference calibration signal that is received by ADC 216 is a high signal-to-noise ratio (SNR) signal, which can be on the order of tens of millivolts to several Volts. The output of calibration signal electronics 226 is further coupled to a calibration signal attenuator 242 of receiver amplifier module 240.

Receiver amplifier module 240 can be used to inject an attenuated calibration signal into receiver antenna 230 in order to generate an output signal that can then be measured and compared to the converted digital reference calibration signal stored in processing element 212. Receiver amplifier module 240 consists of calibration signal attenuator 242, a calibration signal injection transformer 244, an input transformer 246, and a receiver amplifier electronics 248. As mentioned previously, calibration signal attenuator 242 receives an analog reference calibration signal as input from calibration signal electronics 226. Calibration signal attenuator 242 attenuates the analog reference calibration signal, and in some embodiments, the analog reference calibration signal can be attenuated based on one or more specific characteristics associated with the geological formation to be measured by receiver antenna 230.

As illustrated, calibration signal attenuator 242 is coupled to calibration signal injection transformer 244, and outputs the attenuated calibration signal to calibration signal injection transformer 244, although it is understood that other signal injector circuits may be provided in place of calibration signal injection transformer 244 without departing from the scope of the present disclosure. Calibration signal injection transformer 244 is coupled between calibration signal attenuator 242 and receiver antenna 230 in order to receive the attenuated calibration signal as input and then inject the signal into receiver antenna 230 via magnetic coupling. Calibration signal injection transformer 244 provides isolation, common mode rejection (CMR), and additional attenuation to the attenuated calibration signal, thereby creating an injected calibration signal that is different from the converted digital reference calibration signal that is stored at processing element 212. However, the combined attenuation and phase response of calibration signal attenuator 242 and calibration signal injection transformer 244 is known, such that processing element 212 can modify the converted digital reference calibration signal into a digital copy of the injected calibration signal that is transmitted into receiver antenna 230. In some embodiments, processing element 212 can perform this signal processing immediately upon receipt of the converted digital reference calibration signal, even before the injected calibration signal is actually generated and transmitted into receiver antenna 230.

The result is a known injected calibration signal input into receiver antenna 230, such that the injected calibration signal is on the same order of magnitude as the signals that will be received on receiver antenna 230 during normal operation and measurement of geological formations. Depending on factors such as transmitter and receiver antenna spacing, frequency, orientation, and formation, this magnitude may range from a new nanovolts to a few millivolts.

The injected calibration signal generates a small output signal at receiver antenna 230, which passes through input transformer 246 and into receiver amplifier electronics 248, which amplify and filter the small output signal and create an amplified receiver output signal. Recalling that the magnitude of the received antenna signal and/or injected calibration signal can range between a few nanovolts to a few millivolts, receiver amplifier electronics 248 would then correspondingly require a large range of adjustable amplification gains in order to cover the entire amplitude range (about 120 dB or $10^6$) and accommodate the limited dynamic range of analog-to-digital converters. In some embodiments, the limited dynamic range of the analog-to-digital converters can be further accommodated during the gain/phase calibration measurements by providing adjustable amplification and attenuation at one or more of calibration signal electronics 226 and calibration signal attenuator 242.

As illustrated, receiver amplifier electronics 248 is coupled to first ADC 214, but it is understood that receiver amplifier electronics can be coupled to either, or both, or ADCs 214, 216. The receiver output signal is an analog signal, and undergoes analog-to-digital conversion before being transmitted to signal processor 212, where it is stored as a digital copy of the amplified receiver output signal. At this point, signal processor 212 has access to, or directly stores, a digital copy of the injected calibration signal and a digital copy of the amplified receiver output signal, and may thereby determine the gain and phase of the receiver assembly (consisting of receiver antenna 230 and receiver amplifier module 240) in order to perform in-situ calibration.

Signal processor 212 first takes the ratio of the amplified receiver output signal to the injected calibration signal. As discussed previously, the combined attenuation and phase response of the calibration signal attenuator 242 and calibration signal injection transformer 244 is known, and can be utilized by signal processor 212 in order to convert the reference calibration signal from calibration signal generator module 220 into the injected calibration signal that is actually transmitted into receiver antenna 230 (without requiring any direct measurement of this transmitted signal). This adjustment is represented in the equations below via the adjustment factors "Attenuation" and "Attenuator Phase". The ratio between the amplified receiver output signal and the reference calibration signal can be used to perform calibration and determine the receiver gain and phase as follows:

$$\text{Receiver Assembly Gain} = \frac{\text{Receiver Output } V}{\text{Calibration Signal } V} \times \text{Attenuation}$$

$$\text{Receiver Assembly Gain (dB)} = 20\log_{10}\frac{\text{Receiver Output } V}{\text{Calibration Signal } V} + \text{Attenuation (in dB)}$$

$$\text{Receiver Assembly Phase (Degrees)} = \text{Receiver Output Phase} - \text{Calibration Signal Phase} - \text{Attenuator Phase}$$

Thus, the gain and phase of the receiver assembly can be determined in-situ by processing element 212. With this information, the receiver assembly has been calibrated, and processing element 212 can then determine the true amplitude and phase of a measured signal received by receiver antenna 230, through a geological formation of interest, from a transmitter antenna, as follows:

$$\text{True Antenna } V = \frac{\text{Measured Antenna } V}{\text{Receiver Assembly Gain}}$$

True Antenna Amplitude (dBm) =

Measured Antenna Amplitude (in dBm) −

Receiver Assembly Gain (in dB)

True Antenna Phase = Measured Antenna Phase −

Receiver Assembly Phase (Degrees)

The determination of the true amplitude and phase of a measured signal can be performed in-situ by processing element 212, at any time, temperature, or other conditions, which beneficially obviates the need to perform an extensive and time-consuming surface calibration of one or more of the temperature drift and the gain and phase offset of a receiver assembly. In some embodiments, the effect of antenna impedance (including changes over temperature and formation loading due to conductive zones and borehole fluids) may also be measured and compensated for, as the antenna impedance also impacts the gain and phase of a receiver assembly.

Figure 3:
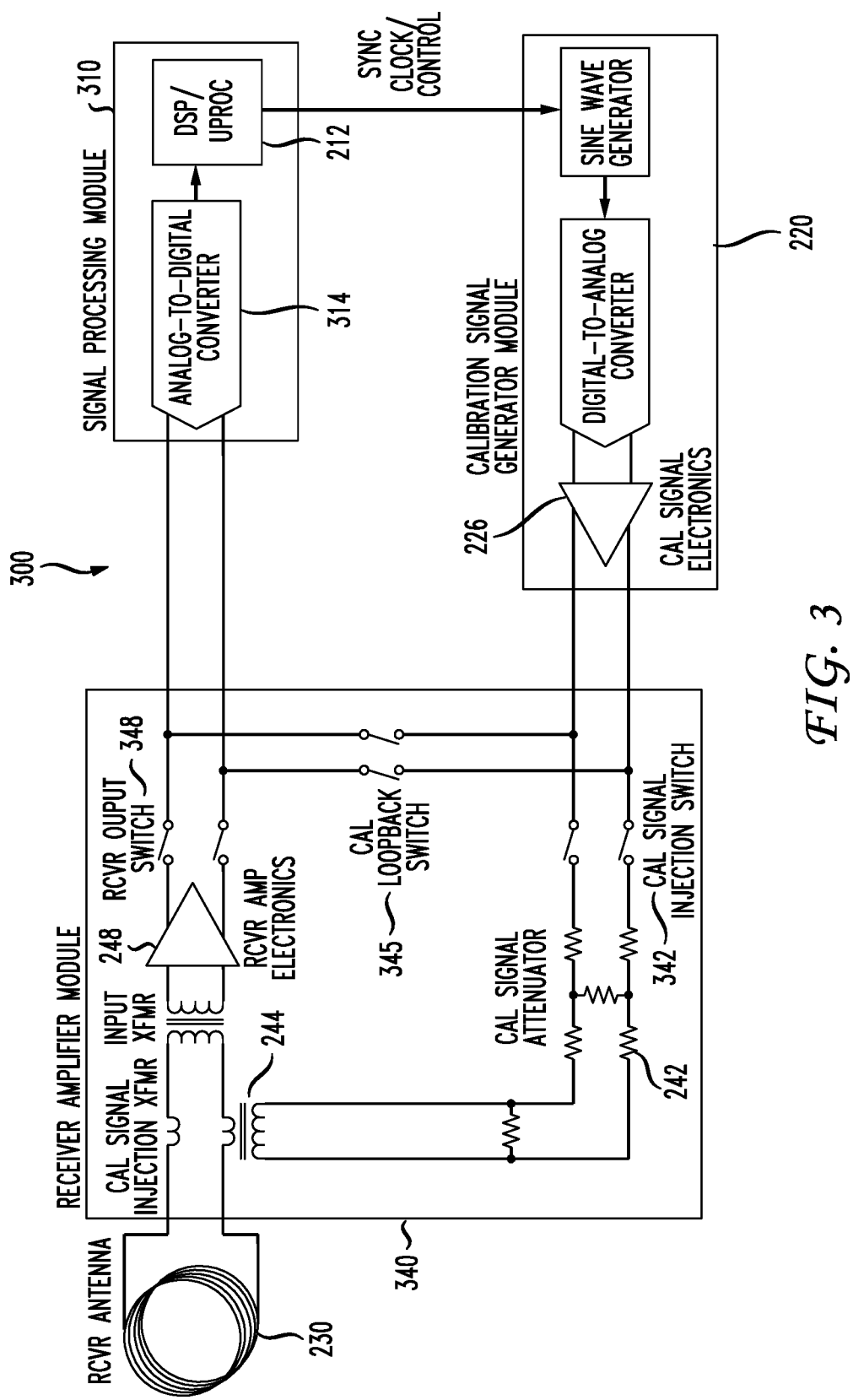
FIG. 3 illustrates a schematic diagram of a modified version of the example in-situ receiver gain and phase calibration system of FIG. 2.

FIG. 3 depicts a schematic diagram of an in-situ receiver gain and phase calibration system 300 that is a modified version of the calibration system 200 depicted in FIG. 2. The common components shared between calibration system 200 and calibration system 300 retain their same numerical labeling, generally indicated by a 200-series number, and generally function in the manner that has been described previously. Components specific to calibration system 300 are generally indicated by a 300-series number, and generally function in a manner that will be described below.

Compared to the previously discussed calibration system 200, the modified calibration system 300 replaces the two ADCs 214, 216 with a single ADC 314, thereby forming a modified signal processing module 310. Additionally, the modified calibration system 300 contains a modified receiver amplifier module 340, wherein three new switches are introduced: a calibration signal injection switch 342, a calibration loopback switch 345, and a receiver output switch 348. For purposes of clarity, each of these switches is illustrated in an open configuration.

Downhole logging tools are often faced with both limited space and available power, particularly in deeper wellbores. As such, it may be desirable to eliminate redundant or multiple instances of a single component, as such a removal can reduce the usage of both physical space and electrical power. Such is the case with modified calibration system 300, which utilizes a single ADC 314, rather than the two ADCs 214, 216. In some embodiments, the single ADC 314 can be provided as a single ADC channel of a multi-channel ADC.

The addition of the three switches 342, 345, 348 enables modified calibration system 300 to perform the same calibration as the calibration system 200 while using only a single ADC 314. These switches can be provided by solid-state analog switches, mechanical relays, or various other switching devices known in the art. In operation, calibration loopback switch 345 is used to isolate the input signal (carried through calibration signal attenuator 242 into receiver antenna 230) from the output signal (carried from receiver antenna 230 and through receiver amplifier electronics 248). Recalling that the desired measurements are the reference calibration signal from the calibration signal generator module 220 and the amplified receiver output signal from the receiver amplifier electronics 248, and example measurement and calibration of the receiver assembly (comprising receiver antenna 230 and receiver amplifier module 340) may be performed as follows.

With each of the three switches beginning in an open position, a reference calibration signal is generated and provided at an output of calibration signal electronics 226, as described previously. Calibration loopback switch 345 is closed, while receiver output switch 348 remains open, thereby coupling the reference calibration signal into ADC 314 and processing element 212, also described previously. Calibration signal injection switch 342 may also be closed at this time, either simultaneously with or in close temporal proximity to the closing of calibration loopback switch 345. As a result of this first switch configuration, the switch positions are adjusted such that ADC 314 and processing element 212 can receive, measure, and store the reference calibration signal.

ADC 314 and processing element 212 can also receive, measure, and store the amplified receiver output signal via a second switch configuration. In this second switch configuration, calibration signal injection switch 342 is moved to a closed position (if not already closed), calibration loopback switch 345 is moved to an open position and receiver output switch 348 is moved to a closed position, thereby coupling ADC 314 to the output of receiver amplifier electronics 248. As a result of this second switch configuration, the reference calibration signal is transmitted from calibration signal electronics 226, attenuated by calibration signal attenuator 242, injected into receiver antenna 230 by calibration signal injection transformer 244, amplified by receiver amplifier electronics 248, before finally being transmitted to signal processing module 310 for measurement and storage of the amplified receiver output signal.

Although calibration system 300 has been described above as first measuring the reference calibration signal using a first switch position and then measuring the amplified receiver output signal using a second switch configuration, it is understood that these two measurements may be performed in the reverse order without departing from the scope of the present disclosure and without affecting the calibration of the gain and phase of the receiver assembly.

Additionally, it is noted that calibration signal injection switch 342 is not strictly necessary for performing the measurements described above. Rather, calibration signal injection switch 342 is used to isolate calibration signal generator module 220 from the remainder of system 300 during normal operation, wherein receiver antenna 230 receives a signal through a geological formation from the transmitter antenna. Although calibration signal generator module 220 could be powered down during normal operation of system 300, signal injection switch 342 may be provided in order to provide an additional layer of security to ensure that no unwanted signal is present in the receiver assembly.

Figure 4:
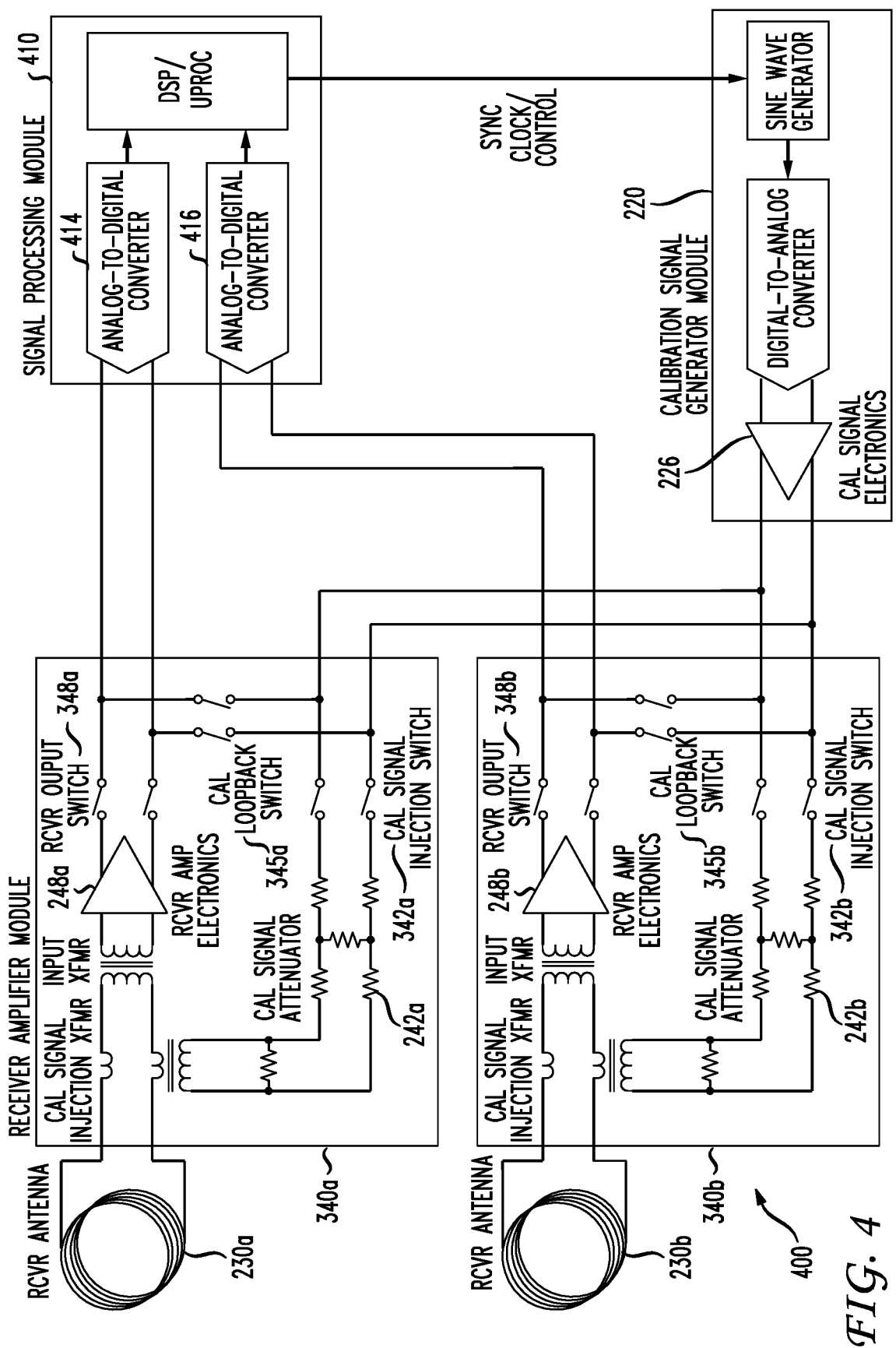
FIG. 4 illustrates a schematic diagram of an example in-situ receiver gain and phase calibration system having multiple receiver assemblies.

FIG. 4 depicts a schematic diagram of an optimized in-situ receiver gain and phase calibration system 400 that extends the calibration system 300 to multiple receiver amplifier modules, illustrated here as 340a and 340b, although it is understood that a greater number of receiver amplifier modules may be provided. Signal processing module 410 contains a first ADC 414 and a second ADC 416, illustrated here as individual components, although it is understood that a single ADC containing a first ADC channel 414 and a second ADC channel 416 may be provided. While calibration system 200 and calibration system 400 both contain two ADCs (or two ADC channels), it is noted that calibration system 200 provides a 2:1 ratio of ADCs per receiver assembly, while calibration system 400 maintains the same 1:1 ratio of ADCs per receiver assembly as was originally introduced with calibration system 300. As such, calibration system 400 continues to make more efficient use of the downhole space and power that are available.

Each of receiver amplifier modules 340a, 340b is coupled to both signal processing module 410 and calibration signal generator module 220, and makes use of the switching arrangement that was introduced and described with respect to calibration system 300 of FIG. 3. However, in comparison to the previously described calibration systems 200 and 300, calibration system 400 can perform an optimized in-situ receiver gain and phase calibration by virtue of its multiple receiver assemblies.

Whereas before the reference calibration signal and the amplified receiver output signal were measured sequentially (i.e. separate in time), calibration system 400 can perform both measurements simultaneously, providing greater accuracy and requiring a shorter period of time. For example, the first receiver amplifier module 340a and the first ADC 414 can measure the reference calibration signal from the calibration signal generator module 220 (calibration signal injection switch 342a open, calibration loopback switch 345a closed, and receiver output switch 348a open) while the second receiver amplifier module 340b and the second ADC 416 measure the amplified receiver output signal from the second receiver amplifier electronics 248b (calibration signal injection switch 342b closed calibration loopback switch 345b open, and receiver output switch 348b closed).

Thus, the two measurements required to determine the gain and phase of the second receiver assembly (consisting of second receiver antenna 230b and second receiver amplifier module 340b) can be obtained simultaneously, reducing the time required for calibration and also reducing any time-based offset or error propagation that may occur in the system. The same procedure can then be performed to obtain the gain and phase of the first receiver assembly, with the switches of each receiver amplifier module 340a, 340b set in the opposite position from those described above.

As was discussed previously, the magnitude of the received antenna signal and/or injected calibration signal transmitted into a receiver antenna 230a, 230b can range between a few nanovolts to a few millivolts, and as such, a large range of adjustable amplification gains are needed at receiver amplifier electronics 248a, 248b in order to cover the entire amplitude range (about 120 dB or $10^6$) and accommodate the limited dynamic range of analog-to-digital converters 414, 416. In some embodiments, the limited dynamic range of the analog-to-digital converters can be further accommodated during the gain/phase calibration measurements by providing adjustable amplification and attenuation at one or more of calibration signal electronics 226 and calibration signal attenuators 242a, 242b. However, calibration system 400 contains multiple receiver amplifier modules 340a, 340b but only a single calibration signal electronics 226, and therefore cannot use the calibration signal electronics 226 to provide independently adjustable amplification and attenuation to each of the multiple receiver amplifier modules simultaneously. Consequently, it may often be desirable to directly generate multiple reference calibration signals each having a variable gain.

Figure 5:
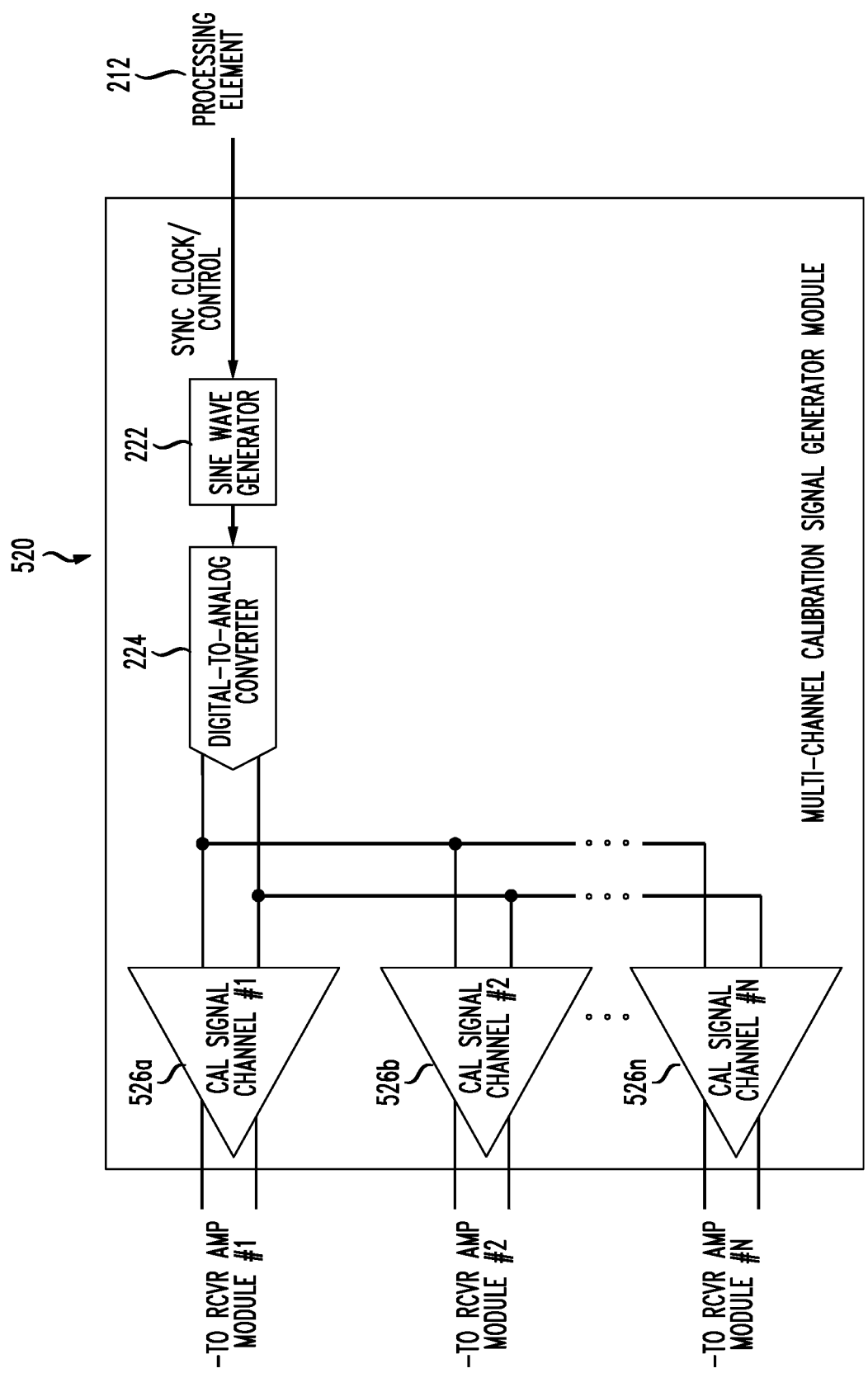
FIG. 5 illustrates a schematic diagram of a multi-channel calibration signal generator.

FIG. 5 depicts a schematic diagram of a multi-channel calibration signal generator module 520 that is compatible with the presently disclosed in-situ receiver gain and phase calibration systems, and is capable of providing independent reference calibration signals with variable gain or attenuation to multiple receiver amplifier modules. In some embodiments, multi-channel calibration signal generator module 520 contains the same sine wave generator 222 and DAC 224 that are found in the previously discussed single-channel calibration signal generator module 220, although it is understood that alternate sine wave generators and DACs may be provided without departing from the scope of the present disclosure.

As illustrated, multi-channel calibration signal generator module 520 contains some integer number, n, of calibration signal electronics 526a-526n, each coupled (with or without an intermediate switch) to a signal processing module and a corresponding receiver amplifier module, as has been described previously. However, each of the calibration signal electronics 526a-526n is further adapted to receive the analog sinusoidal waveform from DAC 224, and, based upon one or more gain characteristics or requirements of the corresponding receiver amplifier module, perform filtering, amplification or attenuation, and buffering on the analog sinusoidal waveform in order to generate an attenuated calibration signal that is uniquely tailored for injection into the corresponding receiver amplifier module.

The previously discussed calibration systems 200, 300, 400 each made use of a calibration signal injection transformer 244 to transmit an attenuated calibration signal into a receiver antenna 230 via magnetic coupling. In many instances, this magnetic coupling method is the most robust injection method, on at least the basis of providing isolation and common mode rejection (CMR). However, particularly when dealing with low frequencies, such as those below 10 kHz, the use of a magnetically coupled injection transformer can make it more difficult to characterize the receiver gain and phase to perform calibration. At these low frequencies, an injection transformer can have a lower impedance, which creates an inductive reactance $Z_L = j2\pi fL$, which can then create an unintentional phase shift and introduce additional attenuation to the system. Further still, the receiver assembly may become more susceptible to changes and drift over temperature, further complicating the calibration process by introducing additional error and sources of uncertainty. As such, some embodiments may make use of alternative injection methods.

Figure 6:
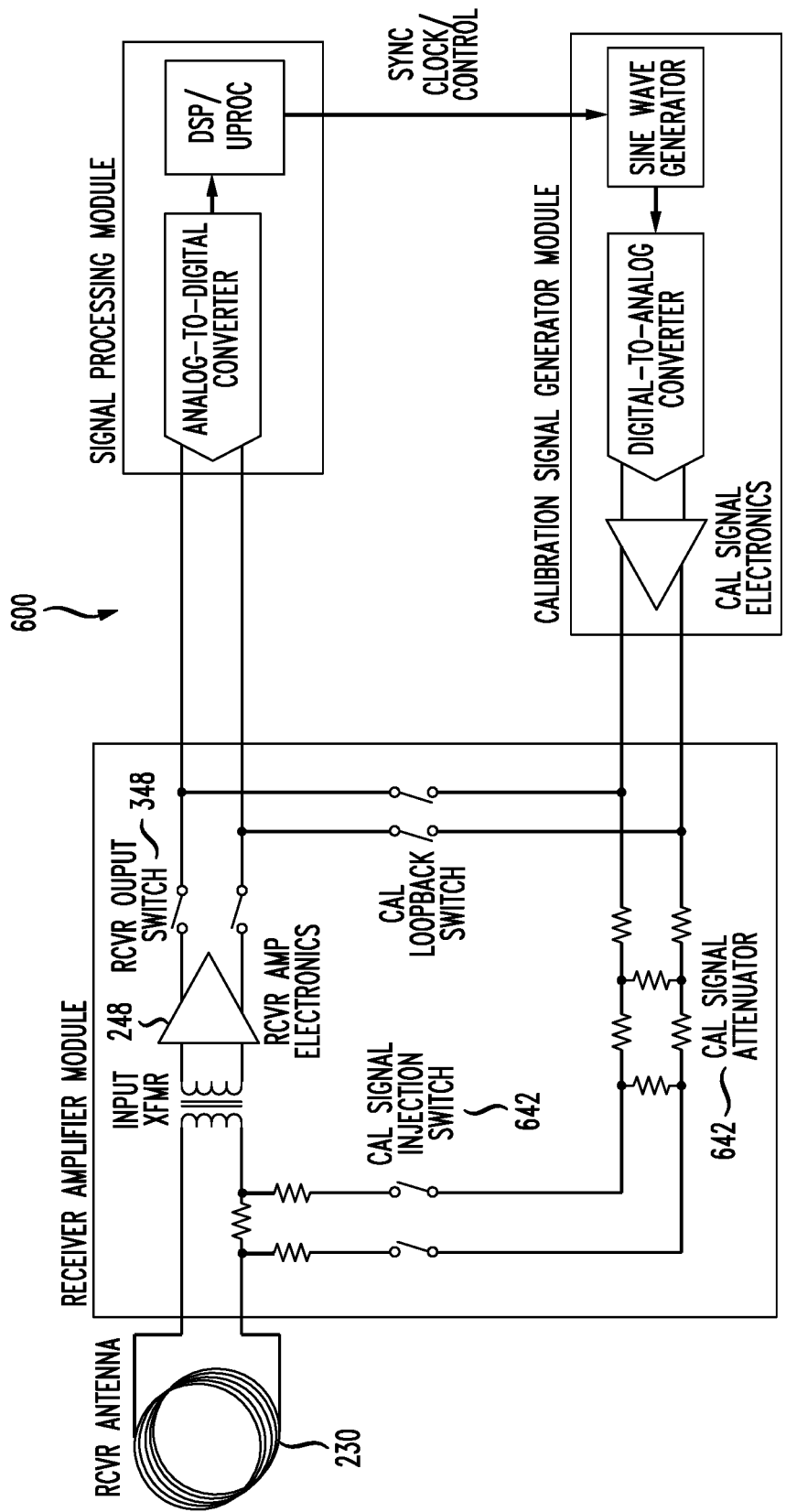
FIG. 6 illustrates a schematic diagram of an example in-situ receiver gain and phase calibration system having direct signal injection.

FIG. 6 depicts a schematic representation of a receiver amplifier assembly 640 that is compatible with the presently disclosed in-situ receiver gain and phase calibration systems, and is capable of providing direct signal injection into receiver antenna 230. With direct signal injection, the last stage of calibration signal attenuator 642 is coupled directly to receiver antenna 230, foregoing any magnetically coupling injection transformer entirely. As illustrated, a calibration signal injection switch 643 can be provided between receiver antenna 230 and calibration signal attenuator 642 in order to provide isolation during regular logging operations or while calibration signal injection is not actively being performed on the particular receiver amplifier module 640.

Figure 7:
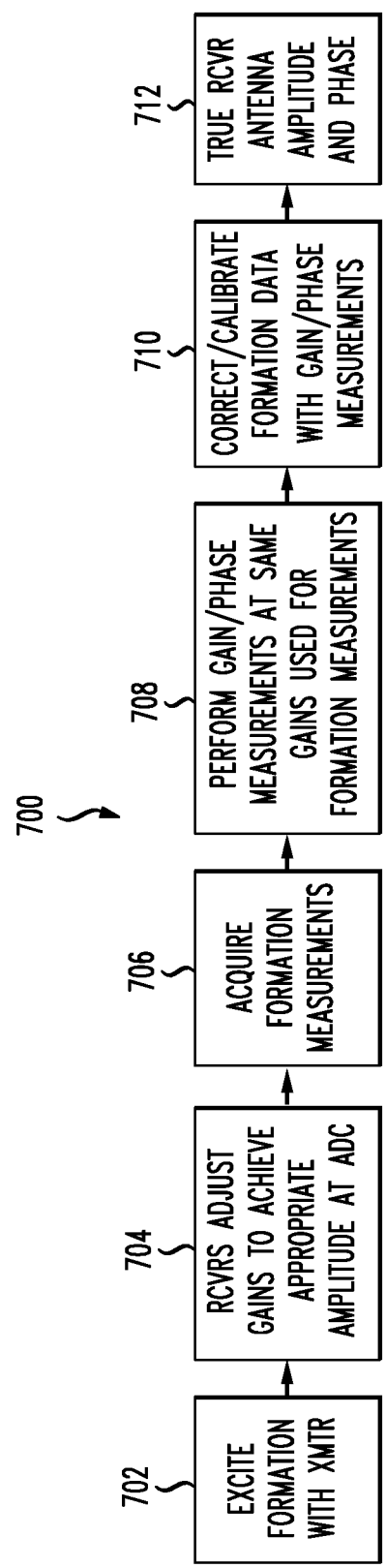
FIG. 7 illustrates an example process for obtaining a formation measurement calibrated by an in-situ calibration system of the present disclosure.

FIG. 7 depicts a method for performing in-situ receiver gain and phase calibration to obtain a fully calibrated formation measurement. In a first step 702, a geological formation that is to be measured is excited by one or more transmitter antennas. In response to this excitation, each of one or more receiver amplifier modules receives a measurement signal, with a certain amplitude and phase.

Based on this measured amplitude, at a step 704, each receiver amplifier module then adjusts its gain in order to achieve an appropriate amplitude that is compatible with the limited dynamic range of an ADC to which the receiver amplifier module is coupled. It many instances, each receiver amplifier module will have a unique gain, although it is possible that one or more receiver amplifier modules will operate with the same gain.

In a step 706, original formation measurements are acquired. Based on the gain determined in step 704, each receiver amplifier module can filter and amplify its received original measurement signal, before transmitting an appropriately amplified original measurement signal to an ADC to which the receiver amplifier module is coupled. The ADC converts the amplified original measurement signal into a digital form, and transmits it to a processing element for storage and later use.

In a step 708, gain and phase response measurements are determined for each receiver amplifier module, in accordance with one or more of the embodiments discussed above, wherein formation measurements are ceased and a calibration system is used to measure and determine two signals for each receiver amplifier module: the reference calibration signal and the amplified receiver output signal. Note that these two signals are obtained entirely separate from the formation measurement and original signals discussed in the previous steps. Upon acquisition, a signal processing module utilizes the reference calibration signal and the amplified receiver output signal to determine the gain and phase response for each receiver amplifier module as discussed previously.

In a step 710, the formation measurements are calibrated (i.e. corrected) using the gain and phase response measurements determined in step 708. The true receiver antenna amplitude can be determined by dividing the originally measured amplitude by the receiver gain, and the true receiver antenna phase can be determined by subtracting the receiver phase from the originally measured phase.

In a step 712, the true receiver antenna amplitude and the true receiver antenna phase are transmitted to the surface, where they enable a more accurate and precise analysis of the formation to be performed. In some embodiments, the true receiver antenna amplitude and the true receiver antenna phase may be stored onboard the downhole tool, and removed for analysis once the downhole tool is removed from a wellbore back to the surface.

In some embodiments, a calibration system of the present disclosure can be used to eliminate crosstalk (XTALK) between one or more receiver assemblies on a downhole tool, thereby providing improved calibration and formation measurements. Crosstalk can be caused by capacitive, inductive, or conductive coupling from one circuit to another, such as when a signal traveling in a first circuit or wire creates interference or other undesired effects in a second circuit or wire. As mentioned previously, downhole logging tools are often faced with space limitations, which can cause a number of circuits or wires to be arranged in a manner conducive to crosstalk.

A calibration system of the present disclosure can measure and calibrate a receiver assembly for crosstalk effects much in the same manner by which the calibration system can measure and calibrate a receiver assembly for gain and phase offset effects—by first measuring and determining the crosstalk on a given receiver assembly as a function of the signals present on the remaining receiver assemblies, and then using this crosstalk information to calibrate and correct a formation measurement signal from the given receiver assembly.

Figure 8:
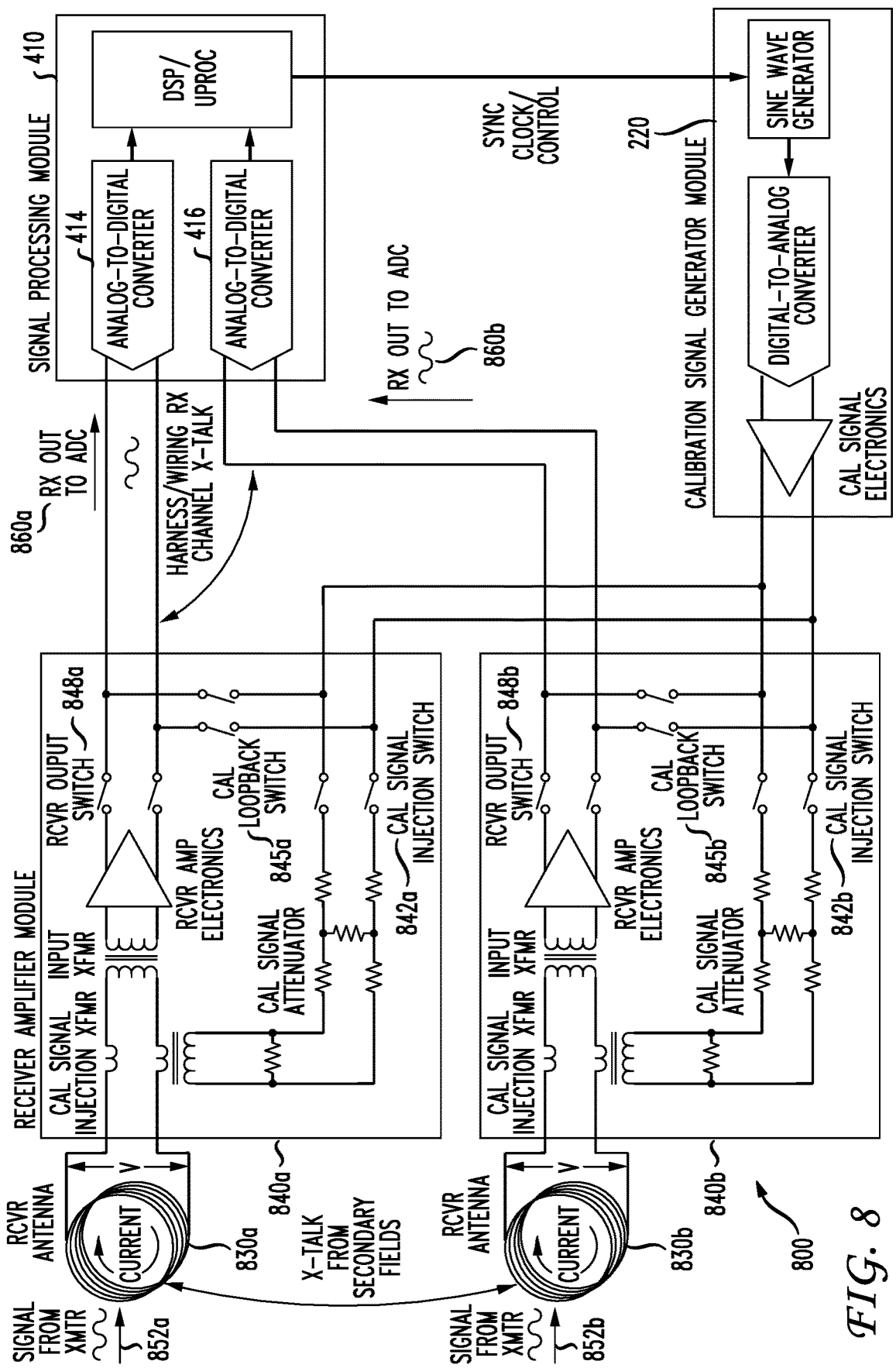
FIG. 8 illustrates a schematic diagram of an example system for performing crosstalk measurement and calibration.

FIG. 8 depicts a schematic diagram of an example in-situ receiver gain and phase calibration system 800 that is capable of performing crosstalk measurement and correction, in addition to the previously described receiver gain and phase measurement and correction. As illustrated, calibration system 800 is identical to the previously presented calibration system 400 of FIG. 4, and in some embodiments, could represent a crosstalk measurement configuration of calibration system 400. However, this is not a limiting configuration, and it is understood that the crosstalk measurement and correction described below is not limited to calibration system 400 or calibration system 800, but may instead be applied to any calibration system of the present disclosure that contains multiple receiver assemblies or receiver antennas.

In an illustrative example of crosstalk, a first receiver antenna 830a receives a transmitter signal 852a from a transmitter antenna (not depicted). If the logging tool is performing a formation measurement, then transmitter signal 852 likely passes through a geological formation prior to being received by receiver antenna 830a, at which point the transmitter signal 852a creates a voltage, or potential difference, across the windings of the receiver antenna 830a. This voltage will then in turn cause a current to flow through the windings of receiver antenna 830a (the voltage and current collectively form the measurement signal that is measured by the logging tool).

However, as would be appreciated by one of ordinary skill in the art, the current flowing through the windings of receiver antenna 830a can create and radiate an additional electromagnetic field that is secondary to the field created by the transmitter antenna. This secondary field can induce crosstalk 856 in a second receiver antenna 830b, which manifests itself as an additional interfering signal that second receiver antenna 830b will measure in addition to the desired transmitter signal 852b. This occurrence is referred to as crosstalk from first receiver antenna 830a on to second receiver antenna 830b, and creates an error or an offset in the desired formation measurement. The opposite scenario is also viable, wherein second receiver antenna 830b induces crosstalk onto first receiver antenna 830a, via the reverse of the process above.

Additional sources of crosstalk can include a voltage potential difference between first receiver antenna 830a and second receiver antenna 830b, or direct capacitive coupling between the receiver antennas, although the direct capacitive coupling may depend on any shielding (or lack thereof) and material dielectrics between the receiver antennas. Crosstalk may be present in other locations, separate from first receiver antenna 830a and second receiver antenna 830b. For example, receiver amplifier modules 840a, 840b will create voltages and currents during the signal amplification process, and these voltages and currents can also induce crosstalk 856 between the multiple receiver amplifier modules 840a, 840b, as well as through the wiring and cabling that connects the antennas and other electronic components.

Because there are so many variable or unpredictable sources of crosstalk, particularly in larger and more electrically complex systems, one solution is to measure and characterize the system crosstalk directly, rather than attempting to mathematically model and predict the system crosstalk. One such process for measuring and characterizing the system crosstalk directly is presented below.

To measure crosstalk on the second receiver assembly (comprising second receiver antenna 830b and second receiver amplifier module 840b) from the first receiver assembly (comprising first receiver antenna 830a and first receiver amplifier module 840a), the first receiver assembly generates and injects a calibration signal into the first receiver antenna 830a and performs amplification on the return signal output from first receiver antenna 830a, consistent with the manner that has been described previously. Meanwhile, the second receiver assembly generates no signals, but instead sits idle, waiting to receive any crosstalk that may be induced. Once induced, the second receiver assembly measures the crosstalk and obtains a complete characterization of the crosstalk on the second receiver assembly as a function of the signal in the first receiver assembly.

In particular, the first receiver assembly sets receiver output switch 848a and calibration signal injection switch 842a to the closed position and sets calibration loopback switch 845a to the open position, thereby allowing the calibration signal to circulate freely through the entire first receiver assembly and into signal processing module 410. By doing so, any possible crosstalk, such as crosstalk 856 and 866, will be induced.

Crosstalk 856 and 866 can couple into the second receiver assembly, which has set receiver output switch 848b to the closed position and has set calibration signal injection switch 842a and calibration loopback switch 845b to the open position (note that this is the configuration the second receiver assembly would normally employ to perform a geological formation measurement, where the calibration signal generator module 220 is decoupled as discussed previously). Any crosstalk coupled into the second receiver assembly induces a signal, which is amplified and transmitted to ADC 416 as described previously. The measurements from the ADC provide the crosstalk on the second receiver assembly as a function of the signal amplitude and phase on the first receiver assembly, allowing the crosstalk to be removed from any given formation measurement signal receiver at the second receiver assembly.

The same crosstalk measurement and correction outlined above may also be employed to measure crosstalk on the first receiver assembly from the second receiver assembly, wherein the respective switch positions described above are reverse, and a calibration signal is generated and transmitted through the second receiver assembly in order to induce and measure the crosstalk on the first receiver assembly.

Figure 9:
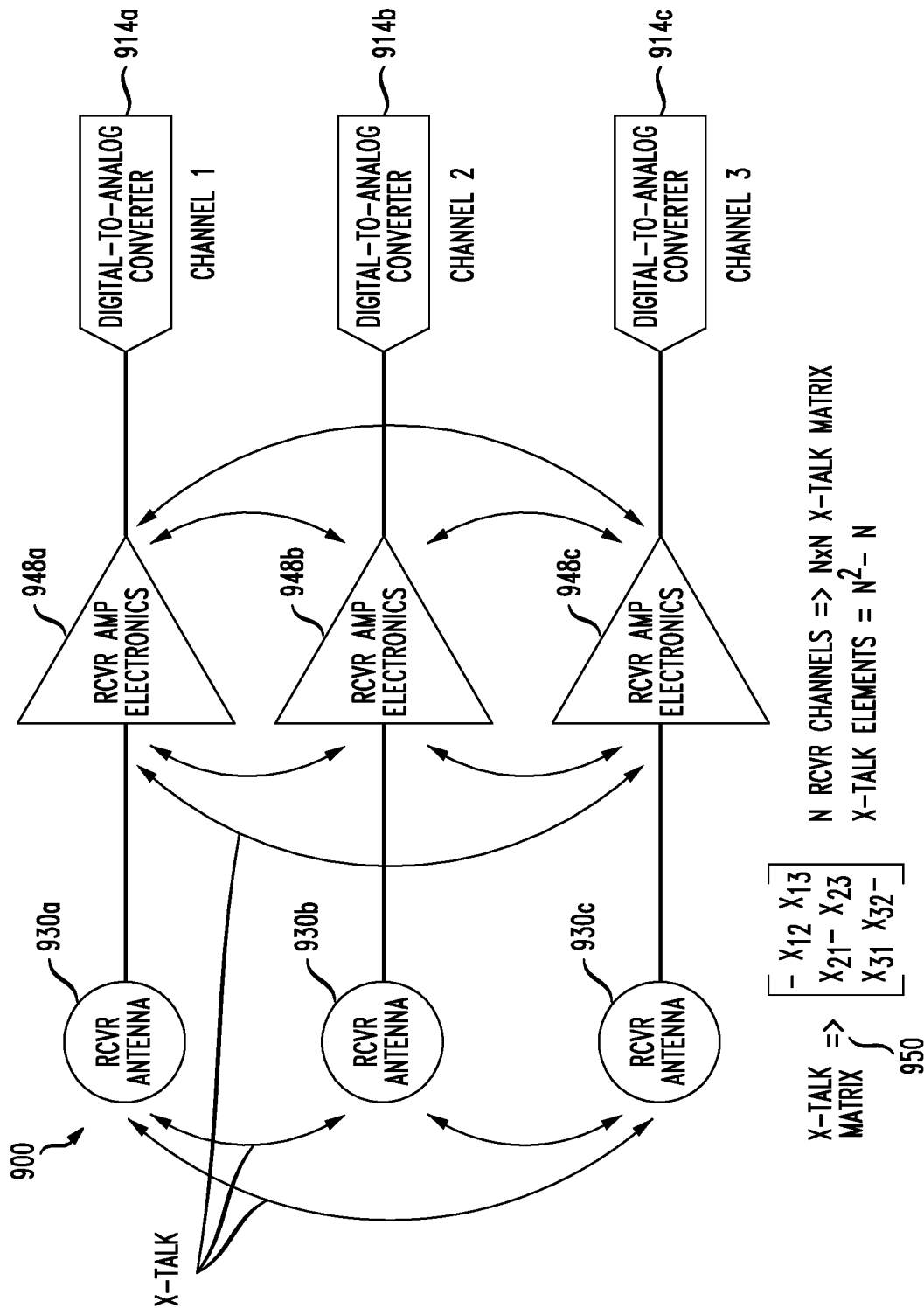
FIG. 9 illustrates a schematic diagram of an example system for performing crosstalk measurement and calibration on three or more receiver assemblies.

Calibration system 800 depicts a crosstalk measurement and correction process for only two receiver assemblies. In many embodiments, a downhole logging tool may be provided with more than two receiver assemblies, in which case a single receiver assembly may receive crosstalk from multiple other receiver assemblies. FIG. 9 depicts a simplified schematic diagram of an example system 900 for cross-talk measurement and correction on three or more receiver channels. This diagram makes use of a simplified visual representation, depicting only receiver antennas 930a-c, receiver amplifier electronics 948a-c, and ADCs 914a-c, although it is understood that the crosstalk measurement and correction described below may be employed with any of the calibration systems of the present disclosure, and more than the three receiver amplifier assemblies that are depicted.

A first receiver antenna 930a and a first receiver amplifier electronics 948a can collectively or individually induce a crosstalk $X_{1,2}$ on a second receiver antenna 930b and a second receiver amplifier electronics 948b, and vice versa, can receive a crosstalk $X_{2,1}$, as discussed above with respect to the two receiver assembly system of FIG. 8. The two parameters $X_{1,2}$ and $X_{2,1}$ can completely characterize the crosstalk present in such a two receiver assembly system.

If a third receiver assembly system (represented here by a third receiver antenna 930c and a third receiver amplifier electronics 948c) is introduced, then additional crosstalk terms will logically follow in the same manner as before. That is, the first receiver antenna 930a and the first receiver amplifier electronics 948 can collectively or individual induce a crosstalk $X_{1,3}$ on the third receiver antenna 930c and the third receiver amplifier electronics 948c, and vice versa, can receive a crosstalk $X_{3,1}$. Similarly, a crosstalk $X_{2,3}$ and a crosstalk $X_{3,2}$ can be induced. Together, these crosstalk terms can be represented in a crosstalk matrix 950, which can be expanded to characterize any integer number, n, of receiver assemblies and their crosstalk relationships.

More generally, in a downhole logging tool provided with some integer number, n, receiver assemblies, a first receiver assembly may induce a crosstalk $X_{1,y}$, $y \in [2:n]$, where y accounts for each of the remaining n−1 receiver assemblies. In some embodiments, the first receiver assembly may inject a calibration signal through its receiver antenna, and the crosstalk $X_{1,y}$ may be measured simultaneously at each of the remaining receiver assemblies, y. In some embodiments, the first receiver assembly may inject a calibration signal through its receiver antenna, and only a single crosstalk element from the desired set $X_{1,y}$, $y \in [2:n]$ may be measured. In other words, the first receiver assembly injects the calibration signal, $X_{1,2}$ is measured, the first receiver assembly injects the calibration signal, $X_{1,3}$ is measured, and so on until $X_{1,n}$ is measured.

Regardless of how the measurements are obtained, this set of crosstalk relationships can be represented as a horizontal row in the crosstalk matrix, and a row can be created for each of the n receiver assemblies, thereby creating the full n×n crosstalk matrix 950, populated with a total of $n^2 - n$ crosstalk relationships. Each possible crosstalk relationship is represented and may be easily located: the row number indicates the receiver assembly that is inducing the crosstalk, and the column number indicates the receiver assembly that receives the crosstalk. With this complete characterization, a true (corrected) formation measurement signal can be obtained as follows: a transmitter antenna excites a geological formation, causing an electromagnetic field or wave to pass through the geological formation and create a measurement signal at each of the n receiver assemblies (these measurement signals also being the cause of any crosstalk that will be present in the system). Recalling that the crosstalk matrix characterizes crosstalk on one receiver assembly as a function of a signal on another receiver assembly, the measurement signal received at each of the receiver assemblies is multiplied with the row of crosstalk coefficients corresponding to that receiver assembly in order to yield the actual crosstalk offset signal that was induced at each of the remaining receiver assemblies.

In other words, a measurement signal $M_1$ obtained at a first receiver assembly is multiplied by each crosstalk coefficient $X_{1,y}$, $y \in [2:n]$, which yields the actual crosstalk offset caused by measurement signal $M_1$ on each of the remaining n−1 receiver assemblies. This process is then repeated for each measurement signal $M_n$ until all crosstalk offsets have been determined, and can be removed from the measurement signals $M_n$, thereby allowing the system to calibrate itself and yield far more accurate measurements of a geological formation.

In some embodiments, one or more receiver antennas may be co-located, and as such, in closer proximity to one another than they would otherwise be if the antennas were individually distributed along the length of the tool body as is typical. Examples of co-located configurations include, but are not limited to, cross (or X) and tri-axial coils. By virtue of their extreme and immediate proximity, co-located coils may experience much higher crosstalk levels, making the crosstalk correction described above highly desirable.

In systems performing both receiver gain and phase measurements and crosstalk measurements, the two measurements may be performed in either order. In some embodiments, the calibration and correction of the formation measurement signals may be performed immediately after a respective one of the two aforementioned measurements is performed. In some embodiments, the receiver gain and phase measurements and crosstalk measurements may both be performed, and then simultaneously applied to calibrate and correct the formation measurement signals.

Figure 10B:
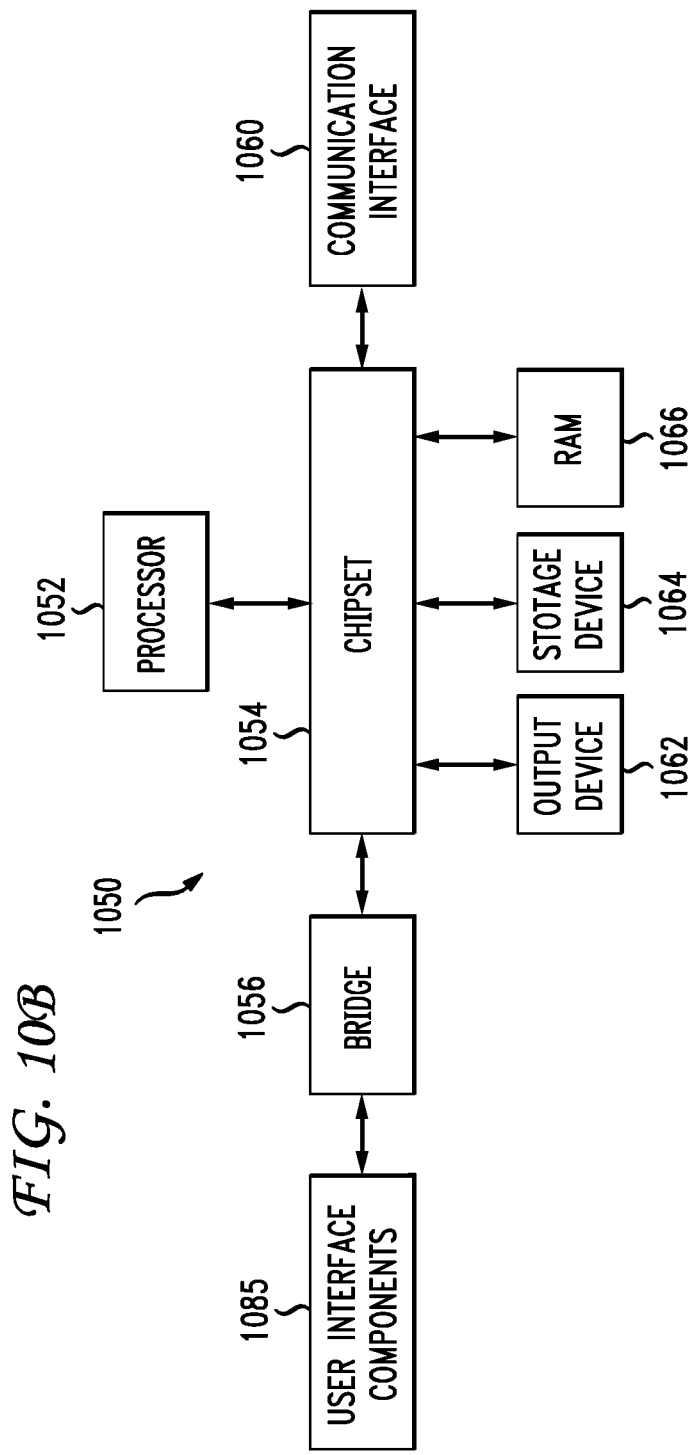
FIG. 10B illustrates a schematic diagram of an example computing device.

FIG. 10 illustrates example computing device which can be employed to perform various steps, methods, and techniques disclosed above. The more appropriate embodiment will be apparent to those of ordinary skill in the art when practicing the present technology. Persons of ordinary skill in the art will also readily appreciate that other system embodiments are possible.

Example system and/or computing device 1000 includes a processing unit (CPU or processor) 1010 and a system bus 1005 that couples various system components including the system memory 1015 such as read only memory (ROM) 1020 and random access memory (RAM) 1035 to the processor 1010. The processors of FIG. 1 (i.e., the downhole processor 44, the local processor 112, and the remote processor 10, can all be forms of this processor 1010. The system 1000 can include a cache 1012 of high-speed memory connected directly with, in close proximity to, or integrated as part of the processor 1010. The system 1000 copies data from the memory 1015 and/or the storage device 1030 to the cache 1012 for quick access by the processor 1010. In this way, the cache provides a performance boost that avoids processor 1010 delays while waiting for data. These and other modules can control or be configured to control the processor 1010 to perform various operations or actions. Other system memory 1015 may be available for use as well. The memory 1015 can include multiple different types of memory with different performance characteristics. It can be appreciated that the disclosure may operate on a computing device 1000 with more than one processor 1010 or on a group or cluster of computing devices networked together to provide greater processing capability. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the processor. The processor 1010 may be a self-contained computing system, containing multiple cores or processors, a bus, memory controller, cache, etc. A multi-core processor may be symmetric or asymmetric. The processor 1010 can include multiple processors, such as a system having multiple, physically separate processors in different sockets, or a system having multiple processor cores on a single physical chip. Similarly, the processor 1010 can include multiple distributed processors located in multiple separate computing devices, but working together such as via a communications network. Multiple processors or processor cores can share resources such as memory 1015 or the cache 1012, or can operate using independent resources. The processor 1010 can include one or more of a state machine, an application specific integrated circuit (ASIC), or a programmable gate array (PGA) including a field PGA (FPGA).

The system bus 1005 may be any of several types of bus structures including a memory bus or memory controller, a peripheral bus, and a local bus using any of a variety of bus architectures. A basic input/output (BIOS) stored in ROM 1020 or the like, may provide the basic routine that helps to transfer information between elements within the computing device 1000, such as during start-up. The computing device 1000 further includes storage devices 1030 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 1030 can include software modules 1032, 1034, 1036 for controlling the processor 1010. The system 1000 can include other hardware or software modules. The storage device 1030 is connected to the system bus 1005 by a drive interface. The drives and the associated computer-readable storage devices provide nonvolatile storage of computer-readable instructions, data structures, program modules and other data for the computing device 1000. In one aspect, a hardware module that performs a particular function includes the software component stored in a tangible computer-readable storage device in connection with the necessary hardware components, such as the processor 1010, bus 1005, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 1000 is a small, handheld computing device, a desktop computer, or a computer server. When the processor 1010 executes instructions to perform "operations", the processor 1010 can perform the operations directly and/or facilitate, direct, or cooperate with another device or component to perform the operations.

Although the exemplary embodiment(s) described herein employs the hard disk 1030, other types of computer-readable storage devices which can store data that are accessible by a computer, such as magnetic cassettes, flash memory cards, digital versatile disks (DVDs), cartridges, random access memories (RAMs) 1035, read only memory (ROM) 1020, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1000, an input device 190 represents any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems enable a user to provide multiple types of input to communicate with the computing device 1000. The communications interface 1040 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 1010. The functions these blocks represent may be provided through the use of either shared or dedicated hardware, including, but not limited to, hardware capable of executing software and hardware, such as a processor 1010, that is purpose-built to operate as an equivalent to software executing on a general purpose processor. For example the functions of one or more processors presented in FIG. 10 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1020 for storing software performing the operations described below, and random access memory (RAM) 1035 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1000 shown in FIG. 10 can practice all or part of the recited methods, can be a part of the recited systems, and/or can operate according to instructions in the recited tangible computer-readable storage devices. Such logical operations can be implemented as modules configured to control the processor 1010 to perform particular functions according to the programming of the module. For example, FIG. 10 illustrates three modules Mod1 1032, Mod2 1034 and Mod3 1036 which are modules configured to control the processor 1010. These modules may be stored on the storage device 1030 and loaded into RAM 1035 or memory 1015 at runtime or may be stored in other computer-readable memory locations.

One or more parts of the example computing device 1000, up to and including the entire computing device 1000, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 1010 can include all types of processors disclosed herein, including a virtual processor. However, when referring to a virtual processor, the processor 1010 includes the software components associated with executing the virtual processor in a virtualization layer and underlying hardware necessary to execute the virtualization layer. The system 1000 can include a physical or virtual processor 1010 that receive instructions stored in a computer-readable storage device, which cause the processor 1010 to perform certain operations. When referring to a virtual processor 1010, the system also includes the underlying physical hardware executing the virtual processor 1010.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

Claim language reciting "at least one of" a set indicates that one member of the set or multiple members of the set satisfy the claim. For example, claim language reciting "at least one of A and B" means A, B, or A and B.

Statements of the Disclosure Include

Statement 1: A logging tool, comprising: a tool body; a signal processor, the signal processor comprising at least one of a processing element and one or more analog-to-digital converters (ADCs); a signal generator coupled to the signal processor, the signal generator generating a reference calibration signal; one or more transmitter antennas associated with a first location in the tool body; one or more receiver assemblies, wherein each receiver assembly is coupled to the signal processor and coupled to the signal generator, and wherein each receiver assembly comprises: a receiver antenna associated with a second location in the tool body; and a signal injector circuit coupled to the receiver antenna, wherein the signal injector circuit transmits an attenuated calibration signal into the receiver antenna to yield a receiver output signal provided to the signal processor via a coupled amplification circuit.

Statement 2: A logging tool according to Statement 1, wherein for a given one of the one or more receiver assemblies, the attenuated calibration signal is generated by attenuating the reference calibration signal based on one or more gain characteristics of the given receiver assembly.

Statement 3: The logging tool according to any of Statements 1 through 2, wherein the given one of the one or more receiver assemblies further comprises an attenuation circuit for generating the attenuated calibration signal, the attenuation circuit coupled between the signal generator and the signal injector circuit.

Statement 4: The logging tool according to any of Statements 1 through 3, wherein the given one of the one or more receiver assemblies is coupled to a corresponding output channel of the signal generator, each corresponding output channel generating the attenuated calibration signal for the given receiver assembly.

Statement 5: The logging tool according to any of Statements 1 through 4, wherein the signal processor calculates gain and phase information for a first receiver assembly by analyzing the reference calibration signal and a first receiver output signal associated with the first receiver assembly.

Statement 6: The logging tool according to any of Statements 1 through 5, further comprising a second receiver assembly, wherein the signal processor measures the reference calibration signal at the second receiver assembly.

Statement 7: The logging tool according to any of Statements 1 through 6, wherein the signal processor uses the gain and phase information for the first receiver assembly in order to correct a measurement signal received at the first receiver assembly.

Statement 8: The logging tool according to any of Statements 1 through 7, wherein the signal processor determines a cross-talk (XTALK) relationship on a second receiver assembly from a first receiver assembly by transmitting a first attenuated calibration signal through the first receiver antenna, measuring a second receiver output signal induced in the second receiver antenna/assembly, and analyzing the first attenuated calibration signal, the first receiver output signal, and the second receiver output signal.

Statement 9: The logging tool according to any of Statements 1 through 8, wherein the signal processor determines an XTALK relationship between a given one of the one or more receiver assemblies and each of the remaining receiver assemblies, thereby creating an XTALK matrix fully characterizing the one or more receiver assemblies.

Statement 10: The logging tool according to any of Statements 1 through 9, wherein one or more switches are used to provide the couplings between one or more of the signal processor, the signal generator, the receiver assembly, the signal injector circuit, the amplification circuit, and the receiver antenna.

Statement 11: The logging tool according to any of Statements 1 through 10, wherein the first location in the tool body is different from the second location in the tool body.

Statement 12: The logging tool according to any of Statements 1 through 11, wherein the signal processor comprises one ADC per receiver assembly.

Statement 13: A method comprising: exciting a geological formation with a transmitter antenna contained on a tool body associated with a logging tool; acquiring formation measurements with one or more receiver assemblies contained on the tool body; generating a reference calibration signal using a signal generator; measuring the reference calibration signal using a signal processor; calculating a corresponding gain and phase response for each of the one or more receiver assemblies by: generating an attenuated calibration signal by attenuating the reference calibration signal based on one or more gain characteristics of the receiver assembly and its corresponding formation measurement; injecting the attenuated calibration signal into a receiver antenna contained in the receiver assembly in order to generate a receiver output signal; and using the signal processor to calculate the gain and phase response of the receiver assembly based on the reference calibration signal and the receiver output signal; and using the signal processor to determine a true formation measurement by correcting each formation measurement based on the gain and phase response of the corresponding receiver assembly used to acquire the formation measurement.

Statement 14: A method according to Statement 13, further comprising using multiple output channels of the signal generator to generate the attenuated calibration signal for each of the one or more receiver assemblies.

Statement 15: A method according to any of Statements 13 through 14, further comprising measuring the reference calibration signal at a first receiver assembly and measuring the receiver output signal at a second receiver assembly in order to calculate the gain and phase response for the second receiver assembly.

Statement 16: A method according to any of Statements 13 through 15, wherein the reference calibration signal is transmitted through an attenuation circuit in order to generate the attenuated calibration signal.

Statement 17: A method according to any of Statements 13 through 16, further comprising calculating the cross-talk (XTALK) relationship on a second receiver assembly from a first receiver assembly by: injecting a first attenuated calibration signal into a first receiver antenna; measuring a second amplified receiver output signal induced in a second receiver antenna/assembly by the first attenuated calibration signal in the first antenna/assembly; analyzing the first attenuated calibration signal, the first amplified receiver output signal, and the second amplified receiver output signal to determine the XTALK on the second receiver assembly as a function of a signal in the first receiver antenna/assembly.

Statement 18: A method according to any of Statements 13 through 17, further comprising determining an XTALK relationship between a given one of the one or more receiver assemblies and each of the remaining receiver assemblies, thereby creating an XTALK matrix fully characterizing the XTALK between the one or more receiver assemblies.

Statement 19: A method according to any of Statements 13 through 18, further comprising correcting each formation measurement based on the XTALK matrix and the XTALK on the corresponding receiver.

Statement 20: A method according to any of Statements 13 through 19, further comprising using one or more switches to provide selective couplings between one or more of the signal processor, the signal generator, the receiver assembly, the receiver antenna, a signal injector circuit, and an amplification circuit.

Statement 21: A system configured according to any of Statements 1 through 20.

What is claimed is:

1. A logging tool, comprising: a tool body;
    a signal processor, the signal processor comprising at least one of a processing element and one or more analog-to-digital converters (ADCs);
    a signal generator directly coupled to the signal processor and directly coupled to a calibration signal attenuator having a known attenuation and phase response, the signal generator generating a reference calibration signal, wherein the reference calibration signal is directly provided by the signal generator to both the signal processor and the calibration signal attenuator, wherein the calibration signal attenuator produces an attenuated calibration signal;
    one or more transmitter antennas associated with a first location in the tool body; and one or more receiver assemblies, wherein each receiver assembly is coupled to the signal processor and coupled to the signal generator, and wherein each receiver assembly comprises:
    a receiver antenna associated with a second location in the tool body; and a signal injector circuit coupled to the receiver antenna, wherein the signal injector circuit transmits the attenuated calibration signal into the receiver antenna, wherein the attenuated calibration signal input to the receiver antenna is amplified by an amplification circuit to generate an amplified receiver output signal that is provided to the signal processor, and wherein the signal processor uses the reference calibration signal, the amplified receiver output signal, and the known attenuation and phase response of the calibration signal attenuator to determine a gain and phase of the receiver assembly.

2. The logging tool of claim 1 wherein for a given one of the one or more receiver assemblies, the attenuated calibration signal is generated by attenuating the reference calibration signal based on one or more gain characteristics of the given receiver assembly.

3. The logging tool of claim 2, wherein the given one of the one or more receiver assemblies further comprises an attenuation circuit for generating the attenuated calibration signal, the attenuation circuit coupled between the signal generator and the signal injector circuit.

4. The logging tool of claim 2, wherein the given one of the one or more receiver assemblies is coupled to a corresponding output channel of the signal generator, each corresponding output channel generating the attenuated calibration signal for the given receiver assembly.

5. The logging tool of claim 1, wherein the signal processor calculates gain and phase information for a first receiver assembly by analyzing the reference calibration signal and a first receiver output signal associated with the first receiver assembly.

6. The logging tool of claim 5, further comprising a second receiver assembly, wherein the signal processor measures the reference calibration signal at the second receiver assembly.

7. The logging tool of claim 5, wherein the signal processor uses the gain and phase information for the first receiver assembly in order to correct a measurement signal received at the first receiver assembly.

8. The logging tool of claim 1, wherein the signal processor determines a cross-talk (XTALK) relationship on a second receiver assembly from a first receiver assembly by transmitting a first attenuated calibration signal through the receiver antenna, measuring a second receiver output signal induced in the second receiver assembly, and analyzing the first attenuated calibration signal, the receiver output signal, and the second receiver output signal.

9. The logging tool of claim 8, wherein the signal processor determines an XTALK relationship between a given one of the one or more receiver assemblies and each of the remaining receiver assemblies, thereby creating an XTALK matrix fully characterizing the one or more receiver assemblies.

10. The logging tool of claim 1, wherein one or more switches are used to provide the couplings between one or more of the signal processor, the signal generator, the receiver assembly, the signal injector circuit, the amplification circuit, and the receiver antenna.

11. The logging tool of claim 1, wherein the first location in the tool body is different from the second location in the tool body.

12. The logging tool of claim 1, wherein the signal processor comprises one ADC per receiver assembly.

13. A method comprising:
exciting a geological formation with a transmitter antenna contained on a tool body associated with a logging tool;
acquiring formation measurements with one or more receiver assemblies contained on the tool body;
generating a reference calibration signal using a signal generator, the signal generator having a direct connection to a signal processor and a direct connection to a calibration signal attenuator with a known gain and phase response;
measuring the reference calibration signal using the signal processor via the direct connection to the signal generator; and
calculating a corresponding gain and phase response for each of the one or more receiver assemblies by:
using the calibration signal attenuator to generate, using the reference calibration signal received via the direct connection to the signal generator, an attenuated calibration signal by attenuating the reference calibration signal based on one or more gain characteristics of the one or more receiver assemblies and one or more corresponding formation measurements;
injecting the attenuated calibration signal into a receiver antenna contained in the one or more receiver assemblies;
amplifying the attenuated calibration signal input to the receiver antenna to yield an amplified receiver output signal; and
using the signal processor to calculate the gain and phase response of the one or more receiver assemblies based on the reference calibration signal, the receiver output signal, and the known gain and phase response of the calibration signal attenuator; and
using the signal processor to determine a true formation measurement by correcting each formation measurement based on the gain and phase response of a corresponding receiver assembly used to acquire the formation measurement.

14. The method of claim 13, further comprising using multiple output channels of the signal generator to generate the attenuated calibration signal for each of the one or more receiver assemblies.

15. The method of claim 13, further comprising measuring the reference calibration signal at a first receiver assembly and measuring the receiver output signal at a second receiver assembly in order to calculate the gain and phase response for the second receiver assembly.

16. The method of claim 13, wherein the reference calibration signal is transmitted through an attenuation circuit in order to generate the attenuated calibration signal.

17. The method of claim 13, further comprising calculating the cross-talk (XTALK) relationship on a second receiver assembly from a first receiver assembly by:
injecting a first attenuated calibration signal into a first receiver assembly;
measuring a second amplified receiver output signal induced in a second receiver assembly by the first attenuated calibration signal in the first assembly;
analyzing the first attenuated calibration signal, the amplified receiver output signal, and the second amplified receiver output signal to determine the XTALK on the second receiver assembly as a function of a signal in the first receiver assembly.

18. The method of claim 17, further comprising determining an XTALK relationship between a given one of the one or more receiver assemblies and each of the remaining receiver assemblies, thereby creating an XTALK matrix fully characterizing the XTALK between the one or more receiver assemblies.

19. The method of claim 18, further comprising correcting each formation measurement based on the XTALK matrix and the XTALK on the corresponding receiver assembly.

20. The method of claim 13, further comprising using one or more switches to provide selective couplings between one or more of the signal processor, the signal generator, the one or more receiver assemblies, the transmitter antenna, a signal injector circuit, and an amplification circuit.

21. A logging tool, comprising:
a tool body;
a signal processor, the signal processor comprising at least one of a processing element and one or more analog-to-digital converters (ADCs);
a signal generator coupled to the signal processor, the signal generator generating a reference calibration signal, wherein the reference calibration signal is provided to both the signal processor and a calibration signal attenuator having a known attenuation and phase response, wherein the calibration signal attenuator produces an attenuated calibration signal;
one or more transmitter antennas associated with a first location in the tool body; and
one or more receiver assemblies, wherein each receiver assembly is coupled to the signal processor and coupled to the signal generator, and wherein each receiver assembly comprises:
a receiver antenna associated with a second location in the tool body; and
a signal injector circuit coupled to the receiver antenna, wherein the signal injector circuit transmits the attenuated calibration signal into the receiver antenna, wherein the attenuated calibration signal input to the receiver antenna is amplified by an amplification circuit to generate an amplified receiver output signal that is provided to the signal processor, and wherein the signal processor uses the reference calibration signal, the amplified receiver output signal, and the known attenuation and phase response of the calibration signal attenuator to determine a gain and phase of the receiver assembly, wherein the gain of the receiver assembly is calculated as a product of the known attenuation of the calibration signal attenuator and a ratio of the amplified receiver output signal to the reference calibration signal.

22. The logging tool of claim 21, wherein the phase of the receiver assembly is calculated by subtracting the phase of the reference calibration signal and the known phase of the calibration signal attenuator from the phase of the amplified receiver output signal.

* * * * *